United States Patent
Hwang et al.

(10) Patent No.: US 8,908,905 B2
(45) Date of Patent: Dec. 9, 2014

(54) DEVICE AND METHOD FOR EMBEDDING WATERMARKS IN CONTENTS AND FOR DETECTING EMBEDDED WATERMARKS

(75) Inventors: Ingu Hwang, Seoul (KR); Sungwook Shin, Seoul (KR); Jongchan Kim, Seoul (KR); Seungkyun Oh, Seoul (KR); Jinseok Im, Seoul (KR); Jungeun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 93 days.

(21) Appl. No.: 13/504,885

(22) PCT Filed: Oct. 27, 2010

(86) PCT No.: PCT/KR2010/007425
§ 371 (c)(1),
(2), (4) Date: Apr. 27, 2012

(87) PCT Pub. No.: WO2011/052992
PCT Pub. Date: May 5, 2011

(65) Prior Publication Data
US 2012/0243727 A1   Sep. 27, 2012

Related U.S. Application Data

(60) Provisional application No. 61/255,856, filed on Oct. 29, 2009, provisional application No. 61/261,757, filed on Nov. 17, 2009.

(30) Foreign Application Priority Data

Mar. 12, 2010   (KR) .......................... 10-2010-0022471
Mar. 12, 2010   (KR) .......................... 10-2010-0022472

(51) Int. Cl.
*G06K 9/00*   (2006.01)
*H04N 21/44*   (2011.01)
(Continued)

(52) U.S. Cl.
CPC ....... *H04N 21/835* (2013.01); *H04N 21/44008* (2013.01); *H04N 5/913* (2013.01); *H04N 21/8358* (2013.01); *G06T 2201/0052* (2013.01); *H04N 2005/91335* (2013.01); *H04N 21/2541* (2013.01); *G06T 1/0085* (2013.01)
USPC ......................................................... 382/100

(58) Field of Classification Search
None
See application file for complete search history.

(56) References Cited

U.S. PATENT DOCUMENTS 5,915,027 A   6/1999   Cox et al.
8,620,018 B2   12/2013   Yamamoto et al.
(Continued)

FOREIGN PATENT DOCUMENTS

CN   1189042 A   7/1998
CN   101156207 A   4/2008
(Continued)

*Primary Examiner* — Atiba O Fitzpatrick
(74) *Attorney, Agent, or Firm* — Birch, Stewart, Kolasch & Birch, LLP

(57) ABSTRACT

Provided are a device and method for detecting watermarks in content carrying watermarks. One method for watermark detection according to the present invention comprises the steps of: extracting the label of a frequency component of the content; generating a bit sequence by making bit values correspond on the basis of changes in the label being extracted; checking correlation while shifting the phase of the band-spreading code (pn sequence) with respect to the generated bit sequence; and checking the amount of phase shift in the band-spreading code at times when the correlation checked in this way falls into the category of autocorrelation, and then determining a bit group having a value corresponding to the amount of phase shift checked in this manner. The bit group determined in this way constitutes part of watermark data.

23 Claims, 22 Drawing Sheets

(51) Int. Cl.
*H04N 21/835* (2011.01)
*H04N 5/913* (2006.01)
*H04N 21/8358* (2011.01)
*H04N 21/254* (2011.01)
*G06T 1/00* (2006.01)

(56) References Cited

U.S. PATENT DOCUMENTS

2003/0012401 A1* 1/2003 Sharma et al. ............... 382/100

2004/0078594 A1* 4/2004 Scott ............................. 713/201
2008/0276324 A1   11/2008 Van Der Veen et al.

FOREIGN PATENT DOCUMENTS

| CN | 101401429 A | 4/2009 |
| KR | 2002-0053980 A | 7/2002 |
| KR | 2003-0065094 A | 8/2003 |
| KR | 10-2005-0002545 A | 1/2005 |

* cited by examiner

US 8,908,905 B2

DEVICE AND METHOD FOR EMBEDDING WATERMARKS IN CONTENTS AND FOR DETECTING EMBEDDED WATERMARKS

CROSS REFERENCE TO RELATED APPLICATIONS

This application is the National Phase of PCT/KR2010/007425 filed on Oct. 27, 2010, which claims priority under 35 U.S.C. 119(e) to U.S. Provisional Application Nos. 61/255,856 filed on Oct. 29, 2009 and 61/261,757 filed on Nov. 17, 2009 and under 35 U.S.C. 119(a) to Patent Application Nos. 10-2010-0022471 and 10-2010-0022472 both filed in Republic of Korea on Mar. 12, 2010, all of which are hereby expressly incorporated by reference into the present application.

TECHNICAL FIELD

The present invention relates to a method and device for embedding watermarks in contents and detecting the embedded watermarks, and in particular to forensic watermarking that enables detection of watermarks included even in pirated contents through an analog interface.

BACKGROUND ART

IPTV or PPV (Pay Per View) services are a business model that allows a viewer to purchase and view paid contents. These services generally adopt DRM (Digital Right Management) including a CAS (Conditional Access System) so that the services can be available only a viewer who made due payment. A CAS, as a technology for protecting an illegal user from accessing contents, allows only qualified users to view a specific program. Data can be scrambled by a transmitter, and the scrambled data can be de-scrambled by the permitted users, so that the user can view the program. FIG. 1 illustrates a general CAS-adopted system. Referring to FIG. 1, the CAS is generally implemented by a set-top box 11 that is provided by a service provider 10. Of course, a TV may include a set-top box function.

However, such CAS fails to prevent an authorized user to illegally view and copy contents. In general, images from the set-top box 11 are directed to an input terminal of a TV. As shown in FIG. 2, for connection between the set-top box and the input terminal of the TV, a device 15, such as a capture board, is connected to an output terminal of the set-top box 11, so that copied images with the same quality as the original images may be generated. Also, images displayed on the TV may be captured by a camcorder 16 to generate copied images. Such pirated contents are distributed to others through DVDs or an Internet file sharing service 19, thus causing huge damage to contents or service providers.

Such content piracy through an analog interface is referred to as an "analog-hole." Various forensic watermarking technologies are suggested to address the illegal reproduction. Upon forensic watermarking, information relating to manufacturers or distribution channels or user's information are unnoticeably inserted into contents, so that when the contents are illegally distributed, information necessary to identify legality of the contents or to trace the distribution channels or distributers can be obtained.

DISCLOSURE

Technical Problem

An object of the present invention is to provide a watermarking and detection method and apparatus that can guarantee reliability of watermark detection from not only illegally reproduced content having the same quality as its original copy but also a reproduced copy having deteriorated quality by an analog hole method.

Another object of the present invention is to provide a watermarking and detection method and apparatus that have more robustness against any attacks damaging the watermark, such as geometric attack, frame rate conversion, or image re-encoding.

A still another object of the present invention is to provide a watermarking and detection method and apparatus that allow for simple implementation.

These objects are not limited thereto, and any other objects providing the effects obtained from the description of the invention may be also included in the scope of the invention.

Technical Solution

According to an embodiment, a method of embedding watermark data into content includes a step of determining a phase shift amount of a band spreading code according to value of a first bit group included in data corresponding to a watermark and phase-shifting the band spreading code by the determined shift amount and a step of selectively changing a transform coefficient of the content according to each bit value of a bit sequence including at least the phase shifted band spreading code.

In some embodiments, the method further includes a step of selecting one among a plurality of band spreading codes according to value of a second bit group included in the data. In this embodiment, the selected band spreading code is phase-shifted depending on the value of the first bit group.

In some embodiments, the phase shift amount is selected among $k*2^p$ (k=0, 1, 2, . . . , p=1, 2, . . . ), and p is a predetermined, fixed value.

In some embodiments, a sync band spreading code having a fixed phase is further included in the bit sequence. A period of the sync band spreading code may have the same as or different from a period of the band spreading code.

In some embodiments, in an image frame sequence constituting the content, the transform coefficient of the content is selectively changed only on an intra picture applied with spatial compression.

In some embodiments, in the step of selectively changing the transform coefficient of the content, image frame sequences constituting the content are separated into frame groups, and selectively changing the transform coefficient of the frame group by correspondingly applying each of the bit to each of the frame groups. In some embodiments, the separated frame group corresponds to, e.g., 0.5 sec.

In some embodiments, in the step of selectively changing the transform coefficient of the content, image frame sequences constituting the content are separated into frame groups, and selectively changing the transform coefficient of the frame group by correspondingly applying each of the bit to every other frame groups. In some embodiments, the separated frame group corresponds to, e.g., 0.5 sec.

In some embodiments, the transform coefficient of some areas of each transform coefficient block of the image frame included in the content is selectively changed.

According to one embodiment, an apparatus of embedding watermark data into content includes a code supplying unit configured to provide a band spreading code and a watermark encoder configured to determine a phase shift amount of a band spreading code according to value of a first bit group included in data corresponding to a watermark, phase-shift the band spreading code by the determined shift amount and a selectively change a transform coefficient of the content according to each bit value of a bit sequence including at least the phase-shifted band spreading code.

In some embodiments, a watermark device including the code supplying unit and the watermark encoder is provided between a descrambler that descrambles scrambled digital compressed image data and outputs it as digital compressed image data and a decoder that decodes the digital compressed image data and outputs it as an image signal. In this embodiment, the watermark device receives the descrambled digital compressed image data and selectively changes the transform coefficient of the digital compressed image data, then applies the changed transform coefficient to the decoder. In some embodiments, the watermark encoder performs entropy decoding on the received digital compressed image data to extract I (intra) picture or I slice, selectively changes the transform coefficient for the extracted I picture or I slice, then performs entropy encoding and applies the changed transform coefficient to the decoder. In some embodiments, the watermark encoder performs entropy decoding on the received digital compressed image data to extract I picture or I slice, performs decoding on the extracted I picture or I slice based on intra prediction, restores the picture or slice of pixel value (pixel value of the picture or slice), converts the picture or slice having the restored pixel value into the picture or slice having a transform coefficient representing a frequency component, selectively changes the transform coefficient obtained by the conversion, performs entropy encoding on the transform coefficient-selectively-changed picture or slice, and then applies it to the decoder.

In an embodiment, the apparatus further comprises a controller that controls the operation of the watermark encoder. In this embodiment, the controller receives a setting value on at least one of quantized shift amount for the band spreading code, number of used band spreading codes, period of the band spreading code, frequency of insertion of the sync band spreading code used for synchronization of the band spreading code, consecutive or non-consecutive mode for making one bit of the band spreading code corresponding to the content, and temporal interval of the content corresponding to one bit of the band spreading code, and controls the watermark encoder so that an operation is performed based on the setting value.

According to an embodiment, a method of detecting a watermark from content includes extracting a level of a frequency component of the content, generating a bit sequence by making bit values correspond based on a change in the extracted level, identifying a correlation shifting a phase of a band spreading code for the generated bit sequence, and identifying a phase shift amount of the band spreading code when the identified correlation is a auto-correlation and determining a bit group having a value corresponding to the identified phase shift amount.

In an embodiment, the method further includes determining another bit group having a pre-assigned value for the band spreading code when the identified correlation is the auto-correlation.

In an embodiment, the method further includes specifying the same bit section as a sync band spreading code over the bit sequence by identifying a correlation of the sync band spreading code having a constant phase with respect to the generated bit sequence, wherein identifying the correlation shifting the phase of the band spreading code is performed on a bit stream before or after the specified bit section. In an embodiment, the method further includes verifying a temporal interval between a plurality of sync bit sections specified as the same bit section as the sync band spreading code, wherein identifying the correlation excludes at least part of the bit stream present between sync bi sections having a temporal interval departing from a predetermined temporal interval from identifying the correlation shifting the phase of the band spreading code.

In an embodiment, in identifying the correlation, the phase shift amount is selected from $k*2^p$ (k=0, 1, 2, ..., p=1, 2, ...), wherein p is a preset constant value.

In an embodiment, in determining the bit group, when the identified correlation corresponds to a auto-correlation, and unless the phase shift amount of the band spreading code is 0 or an integer multiple of $2^p$ (p=1, 2, ...), a value closest to 0 or the integer multiple is deemed as the phase shift amount, and a corresponding value is determined.

In an embodiment, generating the bit sequence includes a first step of converting the extracted level into a level variation ratio, a second step of splitting into time sections based on a point where the level variation ratio crosses upper and lower thresholds, a third step of determining a bit inserting period based on a temporal interval frequency between upper peaks of the level variation ratio, between lower peaks of the level variation ratio, or between the upper and lower peaks of the level variation ratio in each of the split time sections, and a fourth step of applying a bit value at every bit inserting period to generate the bit sequence. In this embodiment, the fourth step is performed starting from an upper peak value or a lower peak value between upper peak values or between lower peak values, the upper or lower peak values having a temporal interval conforming to the determined bit inserting period. In the fourth step, when an upper peak value larger than the upper threshold and a lower peak value smaller than the lower threshold are both present in the determined bit inserting period, a first bit value applies to the inserting period, and otherwise, a compliment number of the first bit value applies to the inserting period. In identifying the correlation, when no value corresponding to the auto-correlation is detected, the upper and lower thresholds are adjusted, so that the second step and its subsequent steps are performed again, and wherein in generating the bit sequence, when the generated bit sequence does not satisfy a characteristic of a difference in number between 1's and 0's of the band spreading code, the second step and its subsequent steps are performed again.

In an embodiment, extracting the level of the frequency component includes generating a signal reflecting a size of a coefficient for some regions of each frequency coefficient block of an image frame included in the content.

According to an embodiment, an apparatus of detecting a watermark from content includes a code supplying unit providing a band spreading code, a signal extractor configured to extract a level of a frequency component from the content, an information extractor configured to make bit values correspond based on a change in the extracted level to generate a bit sequence, and a watermark decoder configured to identify a correlation shifting a phase of a band spreading code provided from the code supplying unit for the generated bit sequence and to determine a bit group having a value corresponding to the phase shift amount of the band spreading code when the identified correlation is a auto-correlation.

In an embodiment, the apparatus further includes a controller configured to control an interface so that watermark data including the determined bit group is received from the watermark decoder and displayed on a screen.

Advantageous Effects

According to at least one embodiment, the present invention provides robustness against any attacks of deteriorating watermark. Thus watermarks included in the content can be well preserved so that the watermarks can be surely detected from the content having the watermarks. Therefore, contents providers' copyrights can be well protected.

According to at least one embodiment, the present invention can simplify content reprocessing for embedding watermarks into the content, thus resulting in cost savings in design or production of apparatuses for watermarking.

BEST MODE

Various embodiments of a method and device for inserting watermarks into contents and detecting the watermarks will be described in detail with reference to the accompanying drawings.

Figure 1:
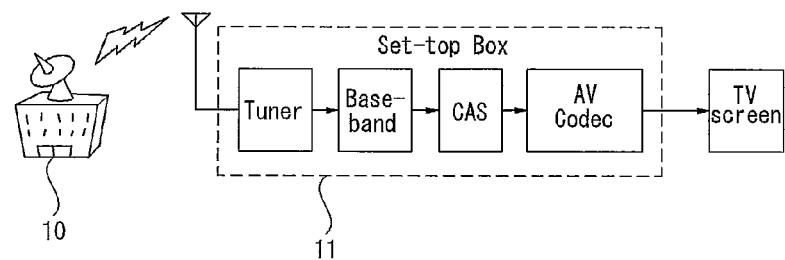
FIG. 1 illustrates an exemplary configuration of a conventional image receiving apparatus having a CAS (Conditional Access System) which puts restriction on receivers, FIG. 2 schematically illustrates a procedure of illegally reproducing/distributing an image through an image receiving apparatus with CAS.
Figure 2:
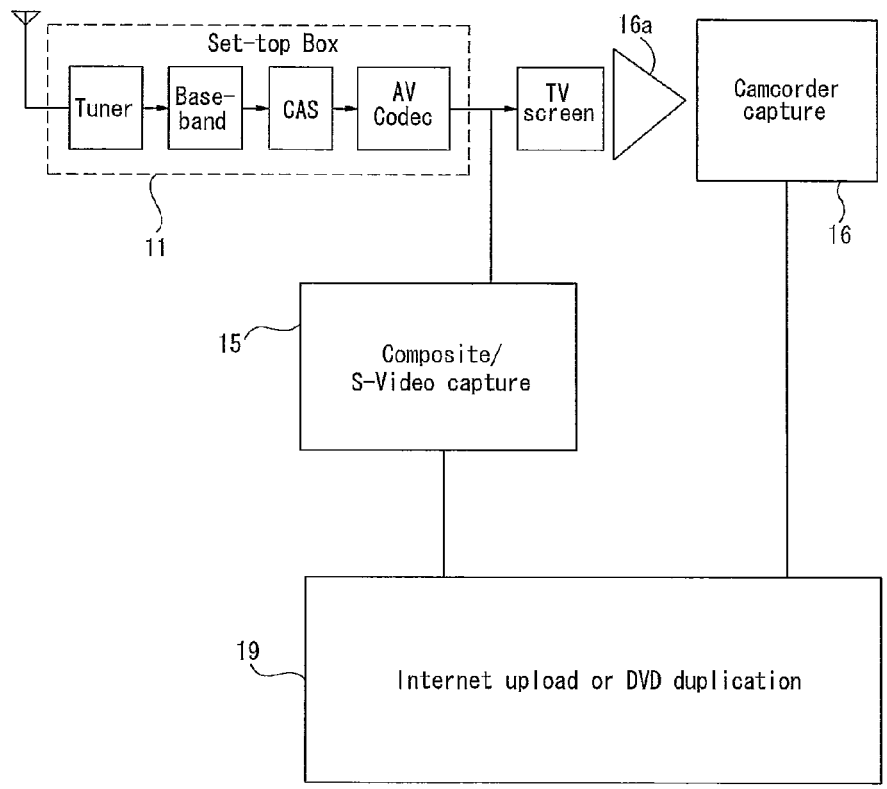
Figure 3:
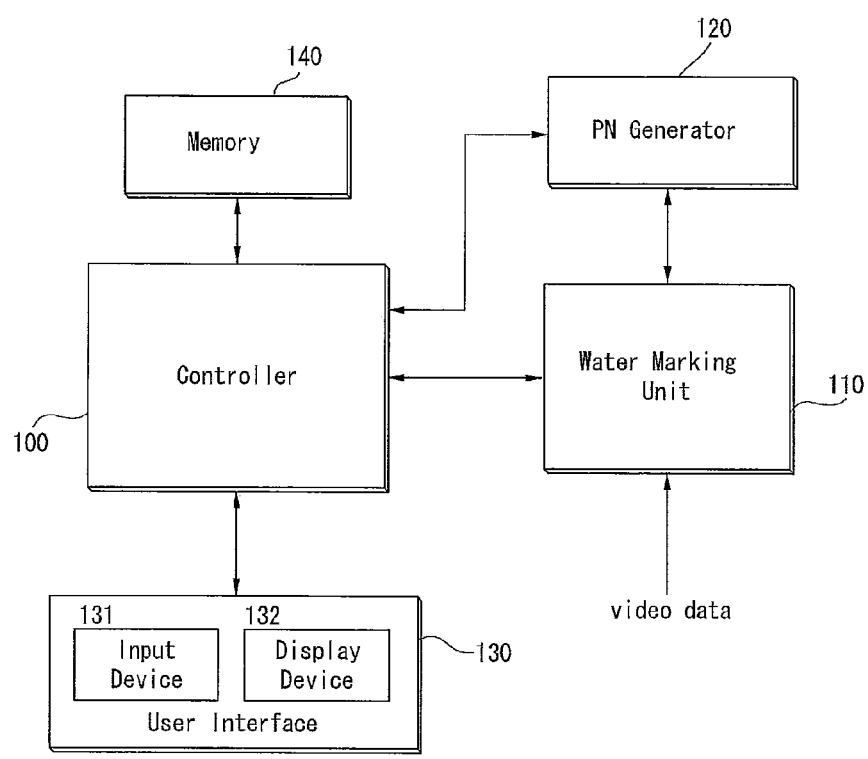
FIG. 3 illustrates an exemplary configuration of an apparatus of inserting a watermark into an image according to an embodiment of the present invention.

FIG. 3 is a view illustrating a configuration of a device for embedding a watermark into an image signal according to an embodiment of the present invention. The device includes a user interface unit 130 that performs input and output with a user, a memory 140 that stores data for performing an embedding operation of a watermark, a PN supplying unit 120 that supplies a P/N (pseudo noise or pseudo-random noise) sequence (hereinafter, "PN sequence") which is a band spreading code (also referred to as "noise code"), a watermarking unit 110 that encodes information corresponding to a set watermark into an image signal, i.e., encodes the watermark, and a controller 100 that controls the overall operation of the components. The user interface unit 130 includes an input device 131, such as a keyboard, mouse, or touchpad, to receive a user's input and a display device 132 that outputs a proper input guide screen image and/or a processing state to the user.

Figure 4:
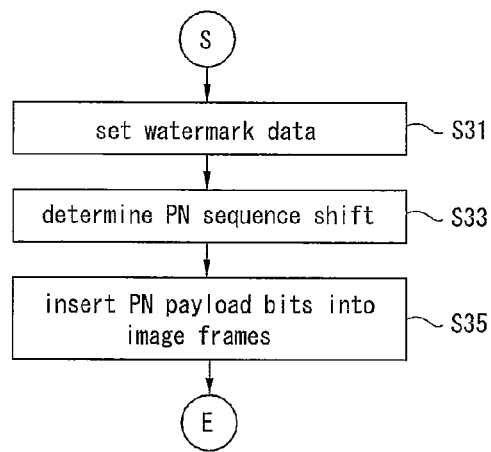
FIG. 4 is a flow schematically illustrating a procedure of embedding a watermark into an image signal according to an embodiment of the present invention.

According to a watermarking method described in connection with FIG. 4, the device illustrated in FIG. 3 encodes the information corresponding to a watermark set by a user into an image signal. Hereinafter, the operation of the device illustrated in FIG. 3 is described in detail with reference to FIG. 4.

Figure 5:
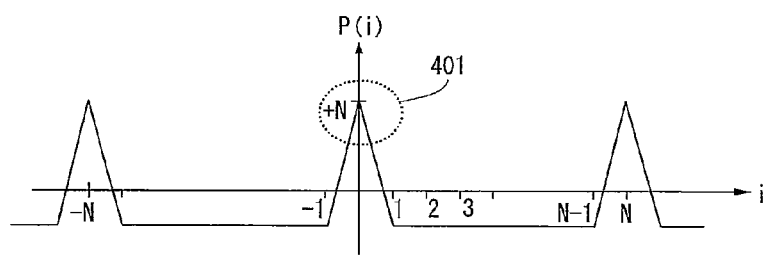
FIG. 5 illustrates a auto-correlation characteristic of a PN sequence used for encoding of watermark data according to an embodiment of the present invention.

According to an embodiment, a PN sequence, which is a band spread code or noise code, is first described. The PN sequence has an auto-correlation characteristic of a thumb shape as depicted in FIG. 5. That is, only upon phase matching, the PN sequence has a high correlation value 401. When phases are mismatched, the PN sequence has a correlation value of '−1'. Based on this auto-correlation characteristic, the shift amount (i.e., shifted phase) of a PN sequence inserted into any signal can be known. Thus, according to an embodiment, the shift amount of a PN sequence is used as an encoding resource when an image signal is subject to watermarking. By doing so, the encoded information is robust against errors.

A user inputs data to be used as a watermark through the user interface unit 130. It is preferable that the data may represent a name, title, or acronym through which the user himself or an organization which the user belongs to can be identified. The watermark data is stored in the memory 140 (S31). The user performs a watermarking operation or sets an operating mode through the user interface unit 130. The operating mode includes, e.g., an "automatic" mode in which inserting a watermark is conducted when image input is detected.

In response to the request, the controller 100 transfers the watermark data set in the memory 140 to the watermarking unit 110 and instructs the watermarking unit 110 to start a watermarking operation. As a method of transferring the watermark data to the watermarking unit 110, the watermark data stored in the memory 140 may be transferred at the same time to the watermarking unit 110. The watermark data may be divided in a bit amount unit which can be processed by a single image signal PN sequence encoding process (the divided bit amount is hereinafter referred to as a "unit bit amount") and the divided watermark data may be transferred to the watermarking unit 110. In the latter case, when a signal of indicating completion of the image signal PN sequence encoding is transmitted to the watermarking unit 110, a subsequent unit bit amount is transmitted, and this process is repeatedly performed.

The controller 100, before instructing the watermarking unit 110 to begin the watermarking operation, may receive a user's watermarking mode through the user interface unit 130 and may set variables which may be determined according to the watermarking mode into the watermarking unit 110. The variables include a quantized shift amount of the PN sequence and the number of PN sequences to be used. These variables will be described below in detail. In some embodiments, the shift amount of the PN sequence is not quantized. That is, the PN sequence is consecutively shifted by one bit, and a single PN sequence is used.

The watermarking unit 110 identifies a first unit bit amount of the transferred watermark data, and according to a value indicated by the unit bit amount, determines a shift amount of the PN sequence provided from the PN supplying unit 120 (S33). This is now described below in detail.

An N period PN sequence may represent N unique shift values. In general, the period N of the PN sequence generated in an n bit size is $2^n-1$. Accordingly, even when all of N cases of shift are used for encoding, $2^n-1$ information values may be represented. Accordingly, one specific value (for example, all consist of 0's or 1's) is not used. For example, in case of a PN sequence with a period N of 127, among 128 values ("0000000", "0000001", . . . , "1111111") representable by 7 bits, 127 values except for "0000000" or "1111111" may be encoded as the PN sequence shift. According to the period N of the PN sequence, as shown in FIG. 5, the maximum value 401 for auto correlation is determined. The maximum value 401 is directly associated with the probability of false detection. That is, the false detection probability is in inverse relation with N. As N increases, a time required to insert watermark data increases. Accordingly, in an embodiment, N is chosen in consideration of a proper trade-off between robustness against errors (low false detection chance) and time required for watermarking. In another embodiment, when watermarking time is a crucial factor, N is set to be smaller, and otherwise, to be larger. In an embodiment, the controller 100 may receive a value N through the user interface unit 130 and set the received value N into the PN supplying unit 120. The PN supplying unit 120 may have PN code generators with various bit sizes to generate the set N period.

In an embodiment, the PN supplying unit 120 is a table that stores one or more PN sequences used for watermarking. In an embodiment, a plurality of PN sequence tables are provided which respectively group PN sequences having different periods. The controller 100 commands designation of a PN sequence table to be used by the controller 100 according to a set N value.

Figure 6:
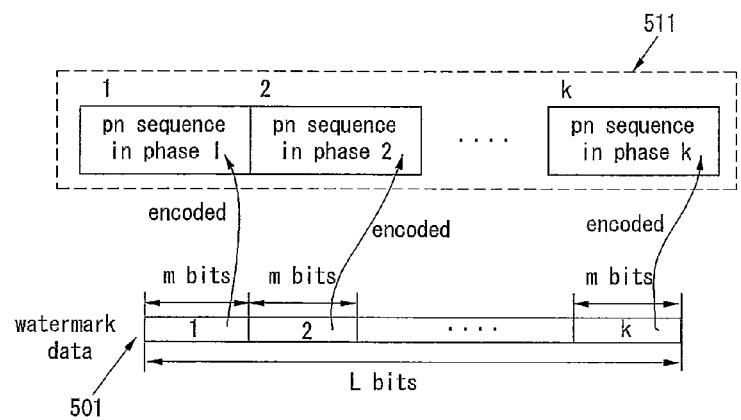
FIG. 6 illustrates an example where unit bit groups constituting watermark data are encoded with PN sequences according to an embodiment of the present invention, FIGS. 7 and 8 respectively illustrate examples where unit bit groups constituting watermark data are encoded with PN sequences according to embodiments of the present invention.

When the shift amount of the PN sequence is determined (S33), the watermarking unit 110 shifts the PN sequence obtained from the PN supplying unit 120 or read from a designated table by the determined shift amount. Then, the watermarking unit 110 encodes each bit value of the shifted PN sequence into the input image signal (S35). The encoding is performed on a per unit bit amount basis in the set watermark data. As a whole, as shown in FIG. 6, when the set watermark data (L bits) 501 consist of k unit bit amounts (each including m bits), a bit sequence 511 corresponding to k PN sequences (the phase of each PN sequence is determined depending on a value represented by the m bits) is encoded into the image signal. When all data (L bits) corresponding to the watermark consists of the PN sequences encoded to have the phase of each PN sequence, the bit sequence 511 is referred to as a "watermark payload".

Figure 7:
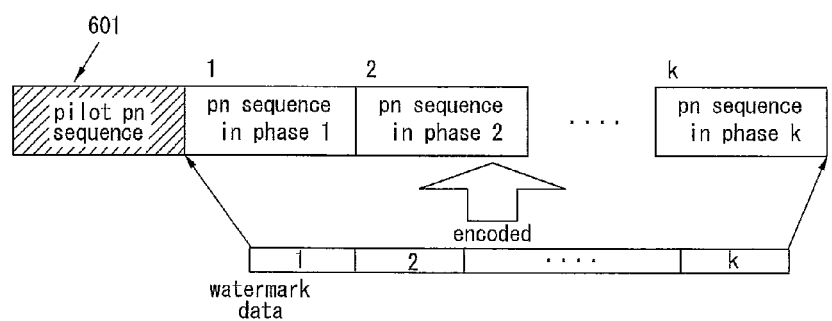

In an embodiment, as shown in FIG. 7, the watermarking unit 110 inserts a sync PN sequence 601 into the head of the watermark payload encoded with the watermark data to facilitate detection of the watermark data. The sync PN sequence (hereinafter, "pilot PN sequence") is pre-defined to perform synchronization in watermark detection and has a constant phase all the time. If the pilot PN sequence is used for synchronization, the watermark detector may be aware of timing of the watermark payload repeated at a constant period or continuously by first identifying a correlation value for the pilot PN sequence. The period of the pilot PN sequence is equal to or different from the period of the PN sequence encoded with the watermark data.

Figure 8:
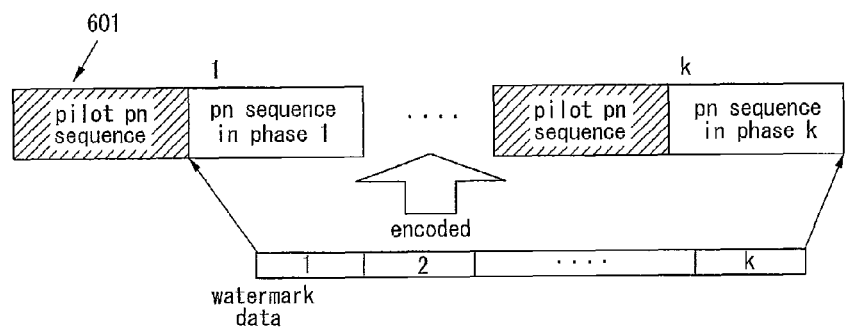

In an embodiment, as shown in FIG. 8, the pilot PN sequence may be inserted into the head of each PN sequence of the watermark payload. Frequent insertion of the pilot PN sequence helps for synchronization (thus, accelerating the detection of the PN sequence encoded with watermark data in light of phase), but increases the overall amount of bits to be inserted, causing time required for watermarking to increase. Accordingly, the frequency of insertion of the pilot PN sequence is determined depending on importance of time required for watermarking.

In an embodiment, the controller 100 receives the insertion frequency or insertion method of the pilot PN sequence from the user interface unit 130 and applies a command for designating this to the watermarking unit 110, so that the watermarking unit 110 adds a pilot PN sequence to the watermark payload according to the designated mode.

In the above embodiments, the shift amount of the PN sequence used for encoding of the watermark data is used as a consecutive variable. That is, the unit bit amount is determined and encoded, with the number of cases of shift amount for the PN sequence having a period N set as N. In other embodiments, the shift amount of PN sequence for the period N is quantized for use. In an embodiment, the shift amount of the PN sequence having a period N is restricted to $2^p$ (p=1, 2, 3, 4, . . . ). For example, when p=4, the PN sequence may be restrictively shifted by 0*16 (=0), 1*16(=16), 2*16(=32), or 3*16(=48). If the shift amount of the PN sequence is quantized, correction may be available. For example, in case that part of the image signal inserted with the watermark is elongated or cut away, thus causing errors over a time axis, so that even though a value other than a predetermined (i.e., quantized) phase comes up, correction may be available. The quantization of the PN sequence shift amount as described above, for example, p in $2^p$ is set by the watermarking unit 110 under the control of the controller 100 in response of a user's input.

In an embodiment, if the shift amount of the PN sequence is used after quantization, the number of cases that can be representable with the PN sequence with the period N decreases, the unit bit amount of the watermark data, by which encoding can be once performed on the PN sequence, also decreases. In case that a consecutive shift amount applies to the PN sequence with period N, if n bits are assumed to be a unit bit amount (of course, as described earlier, the number of representable cases becomes $2^n-1$), when the shift amount is quantized with $2^p$, the number of cases where encoding may be done to the PN sequence decreases to $N/2^p$. Accordingly, if the fact that the number of representable case is insufficient by 1 is disregarded, the unit bit amount becomes 'n–p'. For example, in case that period N is 127 (=$2^7-1$), if a consecutive shift amount is used, 7 bits become the unit bit amount, but if the shift amount is quantized to 16 (=$2^4$), the number of cases for shift amount is 8 (=$2^3$), such as 0, 16, 32, 48, . . . , 112, and thus 3 bits (=7–4) become the unit bit amount. Accordingly, in this embodiment, in case that the shift amount of the PN sequence with period N (=$2^n-1$) is quantized with $2^p$, the watermark data is encoded with the PN sequence every 'n–p' bits. In other words, in the above example, in determining the shift amount of the PN sequence by the watermarking unit 110 (S33), the watermarking unit 110 identifies the watermark data on a per 3 bit size bit group basis and makes determination in such a way that if the value of each bit group is "000", then the shift amount of the PN sequence is 0, if "000", then 16, and if "010", then 32.

In an embodiment, in quantizing the shift amount of the PN sequence, any number, e.g., a prime number, may be selected rather than one of multiples of two. For example, when a reference number R for quantization is 3, the quantized shift amounts are 0, 3, 6, 9, 12, . . . , and when R is 5, the quantized shift amounts are 0, 5, 10, 15, . . . . At this time, the maximum S that satisfies (N/R)=2S becomes the unit bit amount. In an embodiment, the number of cases for the quantized shift amounts may be larger than 2S obtained based on determined S. Accordingly, in this case, the cases for the quantized shift amounts are not partially used for encoding or may be used for signal transmission for other special purposes.

Figure 9:
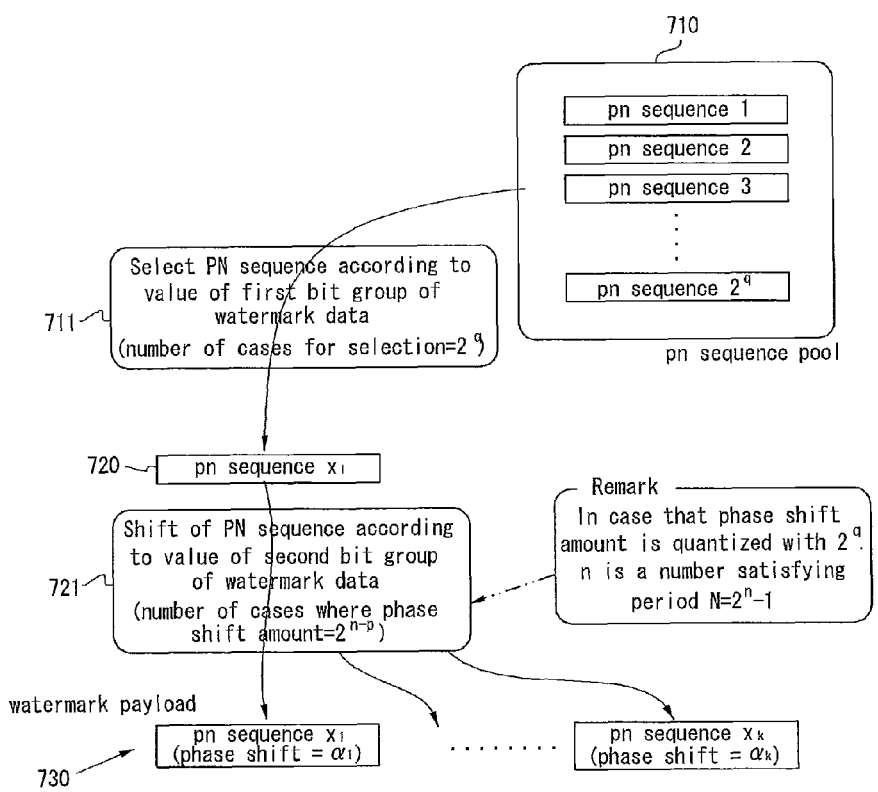
FIG. 9 illustrates an example where watermark data is encoded with one or more PN sequences according to an embodiment of the present invention.

In an embodiment, watermark data is encoded into not only the shift amounts of the PN sequences but also the type of the used PN sequences. As described in the above embodiment, if the shift amounts of PN sequences are quantized for use, the unit bit amount encoded with the PN sequence is relatively reduced. To compensate for this, a PN sequence having a larger period N may be chosen. However, this may increase the size of payload, thus causing disadvantages in light of watermarking. This embodiment can compensate for such disadvantages. FIG. 9 shows an example where a PN sequence is selected and used for encoding according to an embodiment. A PN sequence included in a pool 710 of PN sequences having a short period N is generated or selectively output by the PN supplying unit 120 according to an input bit stream of the controller 100, so that even when one PN sequence belonging to the PN sequence pool 10 is selected as the watermark payload, information can be subject to encoding (711). If the number of PN sequences in the pool 710 is 2q (although 2q is exemplified for convenience of description, any other number of PN sequences may constitute the pool), in selecting one PN sequence from the PN sequence pool 710, information of a bit group having a q bit size may be encoded.

In an embodiment, as shown in FIG. 9, as the watermarking unit 110 chooses one of the quantized shift amounts with respect to the selected one PN sequence 720 as described above (721), the bit group included in the watermark data is additionally encoded. As described above, in the case that a PN sequence whose period N (=$2^n-1$) is quantized as $2^p$, the number of cases becomes $2^{n-p}$, and 'n–p' bits may be thus encoded in addition to the q bits. That is, the unit bit amount becomes 'q+(n–p)'. For example, if a PN sequence is used with n=7 and a period of 127, the number of PN sequences in the PN sequence pool is 16 (=$2^4$, q=4), and only eight phases (0, 16, 32, 48, . . . , 112) with p=4 are used as the shift amounts, a bit group having a bit size of 7 {=4+(7–4)} may be encoded. Of course, as shown in FIG. 9, if the watermark payload 730 consists of k PN sequence streams, the size of information that may be encoded with the watermark payload increases k times again, totaling k*{q+(n–p)} bits. In an embodiment, the watermark payload constituted by the encoded watermark data may be also added with a pilot PN sequence for synchronization by the method illustrated in FIG. 7 or 8.

In an embodiment, the watermark payload configured according to the above-described embodiment or a pilot PN sequence-added watermark payload is consecutively or periodically encoded into the image signal (S35). At this time, the consecutive mode or encoding period is set by the controller 100 or may be set by a user through the user interface unit 130.

Next, a method of encoding each bit included in the watermark payload into an input image signal by the watermarking unit 110 according to an embodiment is described. In an embodiment, assume that the image signal input to the watermarking unit 110 is image data digitally compressed by a codec. Of course, when the input image signal is an analog image signal, an additional codec may be included in the device of FIG. 3 to convert the analog image signal into digitally compressed image data and to provide the converted data to the watermarking unit 110. The codec may encode the input image signal in an MPEG-2 scheme, H.264/AVC scheme, or other known encoding schemes.

Figure 10:
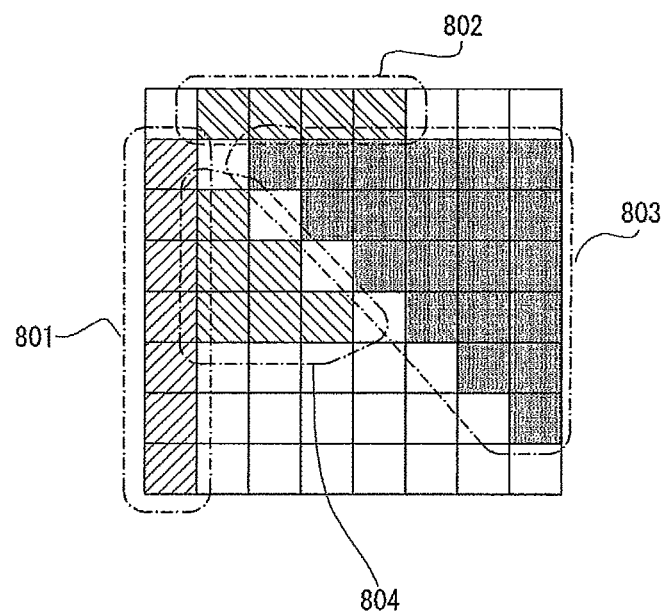
FIG. 10 illustrates examples of areas in which coefficients are adjusted depending on the bits of the PN sequence in each block constituting an image picture or slice according to an embodiment of the present invention.

In an embodiment, the digitally compressed image data input to the watermarking unit 110 is a signal converted from a time domain into a frequency domain, and the converted image frame includes a transform coefficient (e.g., discrete cosine transform coefficients) representing the size of each frequency component instead of a pixel value. To be aware of the transform coefficient for each frequency component, the watermarking unit 110 may entail a pre-processing procedure appropriate for the digitally compressed image data. This pre-processing procedure will be described later. The transform coefficients are closely associated with the screen properties. For example, at an edge portion, transform coefficients corresponding to a high frequency increase, and at a plat portion, the transform coefficient is small or as is often case it is 0. When scene change does not occur in the image signal, the screen consecutively changes with time, so that the energy of a specific band of frequency (which is reflected as a transform coefficient) over the entire screen does not exhibit a large change over time. Accordingly, in an embodiment, the watermarking unit 110 changes the transform coefficient (i.e., energy) of the specific band of frequency in the image frame according to the bit value of the watermark payload to be currently encoded. For example, if the to-be-encoded bit value is 1, the specific band of energy increases (e.g., the transform coefficient is doubled) and when the bit value is 0, no change occurs or energy decreases (e.g., the transform coefficient is decreased by 0.5 times). FIG. 10 shows a 8×8 unit block constituting an image frame. In an embodiment, a specific area 801, 802, 803, or 804 to adjust the transform coefficient depending on the bit value is included in the block (each area 801, 802, 803, and 804 of the unit block constituted of transform coefficients corresponds to a specific frequency band). Of course, the transform coefficient may be adjusted by combining the areas of the block shown in FIG. 10. The modification of the transform coefficient based on the bit value may be made on the whole or a predetermined portion of the image frame. In an embodiment, a specific condition may be placed so that only for an area satisfying the condition the transform coefficient may be converted thus minimizing the deterioration of image quality. The specific condition includes whether a transform coefficient is as small as a designated rate or more compared to the transform coefficients of other areas in the image frame. In an embodiment, if the energy for the whole frame is converted, it provides more robustness against attacks such as rotation or frame cropping for getting rid of watermark. Also, in an embodiment, it is not necessary for the coefficients to have the same variance upon changing the frequency coefficient for encoding the bit value, that is, when changing the transform coefficient. A proper variance for each transform coefficient may be selected. For example, the variance or change rate may vary depending on the size of each transform coefficient. As variation in energy increases to encode the bit value, the likelihood of detection increases, but the quality decreases. Accordingly, in an embodiment, the optimal coefficient variation is determined to provide balance between the deterioration of quality and detection probability.

Figure 11:
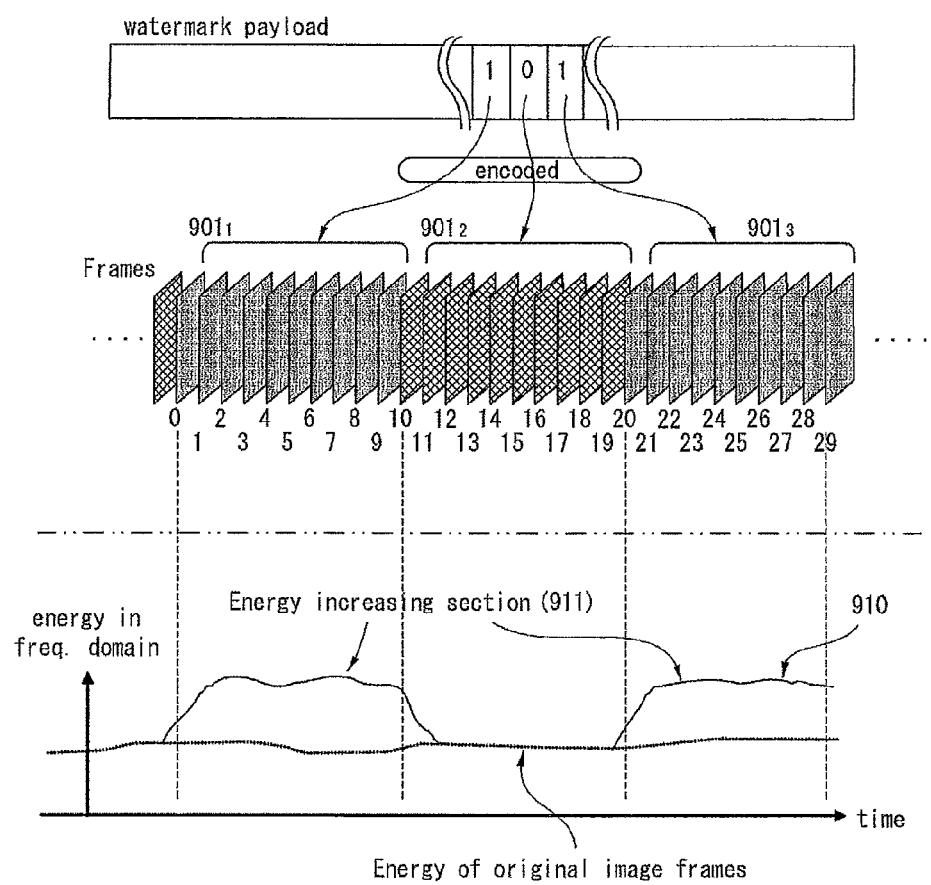
FIG. 11 illustrates an example of encoding each bit of the watermark payload into the image frames according to an embodiment of the present invention.

In an embodiment, in case of changing the transform coefficient depending on the bit value to be currently encoded, the watermarking unit 110 changes the transform coefficient (frequency coefficient) for each or a combination of the areas 801, 802, 803 and 804 of the unit block shown in FIG. 10 as included in each frame or part of each frame with respect to a predetermined number of temporally consecutive image frames. This is exemplified in FIG. 11. In FIG. 11, one bit value corresponds to ten frames with the frequency coefficient changed or maintained. However, the ten frames are provided for purposes of illustration. The number of frames, i.e., temporal interval may be properly selected. The number of frames (temporal interval) may be set as one of various numbers within a limited range to the watermarking unit 110 through the controller 100.

As shown in FIG. 11, if the transform coefficients are increased or maintained for each of consecutive frame groups 901j, the watermark detection device detects the trend 910 of energy (transform coefficient) level at a specific frequency band of the corresponding image signal and is aware of a time section 911 during which energy is increased. The watermark detection device recognizes a value of the time section as '1' (or according to an encoding scheme, '0') and a value of the remaining section as '0'.

In an embodiment, the energy change of frame according to the bit value is performed on all the pictures of I/P/B (Intra/Inter/Bi-directional picture).

Figure 12:
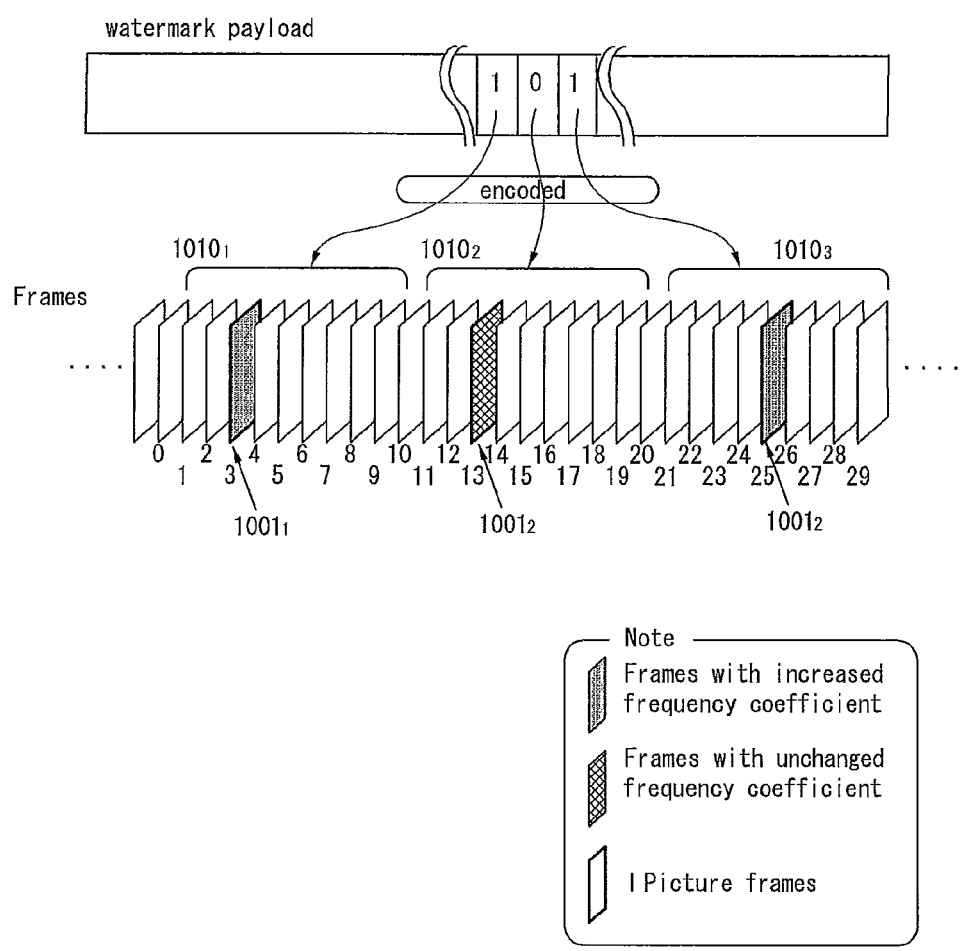
FIG. 12 illustrates an example of encoding each bit of the watermark payload into the image frames according to an embodiment of the present invention.

In an embodiment, energy change based on bit value is conducted on the I (Intra) picture which has not been temporally compressed but spatially compressed. In an embodiment, if an energy changed coefficient exists in the I picture, a value defined by the coefficient is generally spread to the coefficient of the P/B picture by a movement estimation/compensation algorithm in a codec. The embodiment utilizes this principle. Since energy change is selectively done only on the I picture, the device for watermarking is relatively less complicated. In an embodiment, as shown in FIG. 12, a picture group $1010_j$ or frame group having at least one or more I pictures ($1001_j$) corresponds to each bit of the watermark payload, and encoding is then performed. That is, the coefficient of the I picture in the picture group is changed ($1001_1$, $1001_3$) or maintained ($1001_2$). An effect of energy change shows up after the I picture in the corresponding group. Thus, upon detection of the watermark payload bit the effect appears delayed by a predetermined frame (time reaching the I picture within the picture group) from the start point of each picture group shown in FIG. 10. In an embodiment, a limit time during which at least one I picture should be inserted into a broadcast signal or the number of frames included in a time longer than the limit time is defined as a frame group for one bit encoding. For instance, for an image signal according to ATSC standard specifying that I picture is transmitted at an interval of 0.5 seconds or less, each bit of the watermark payload is encoded on a per 0.5 seconds basis (in case of 30 frames per second, every 15 frames)

Figure 13:
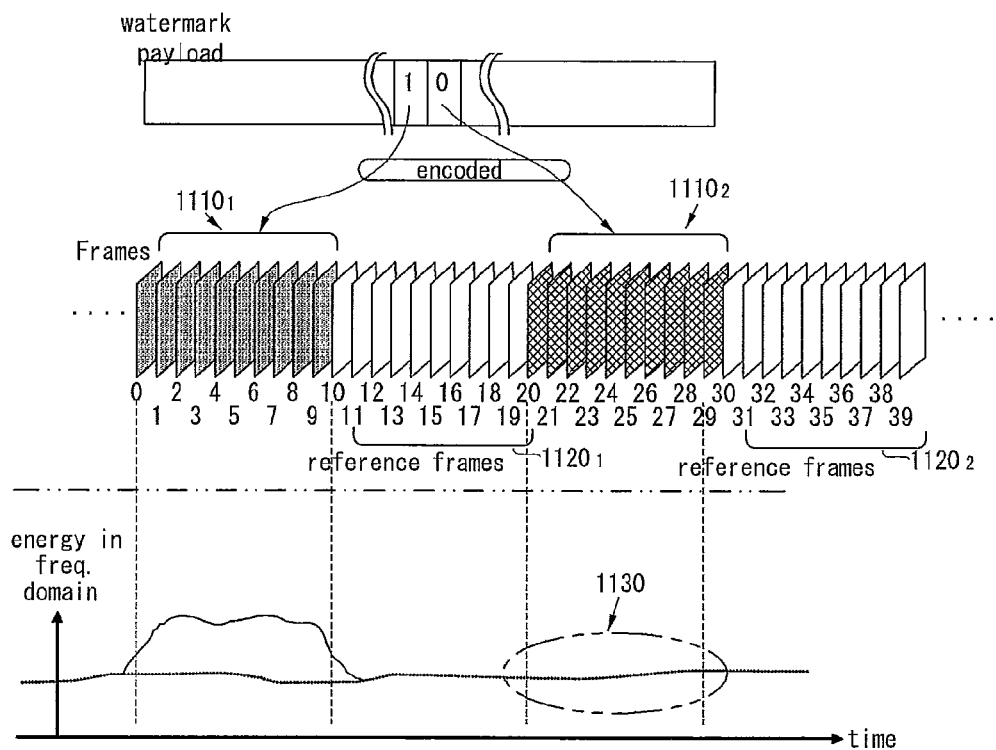
FIG. 13 illustrates an example of encoding each bit of the watermark payload into the image frames according to an embodiment of the present invention, FIGS. 14 and 15 respectively illustrate examples where other devices have watermarking functions according to embodiments of the present invention.
Figure 13:
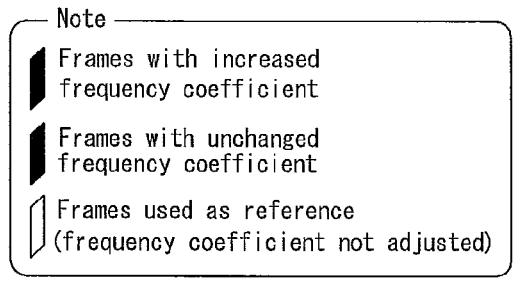

In an embodiment, as shown in FIG. 11, a reference frame group $1120_j$ is assigned for reference energy between frame groups each assigned with each bit of the watermark payload. The reference frame group $1120_j$ has the same number of frames as the frame group $1110_j$ assigned with the bit of watermark payload. The reference frame group allows the detecting device to be more easily aware of whether there is change in energy. That is, even when energy level of an image changes with time due to the shift amount of scenes, the reference frame group enables easier detection of a relative change of energy compared to neighboring reference energy due to the watermark payload bit. Although it is illustrated in FIG. 13 that the frames of the reference frame group and the frames of the frame group $1110_2$ encoded with a bit value of 0 are colored to be distinguished from each other, this is intended to merely represent the bit value has been encoded. Since there is no change in energy of the frame group $1110_2$ encoded with the bit value of 0, upon detection, the energy level of the reference frame group does not show a great change from the energy level of the neighboring frame group (1130). Of course, as mentioned above, in the case that encoding is conducted with the bit value of 0, energy may be made to be reduced rather than maintaining the original energy of the frame.

As described above, when only the I picture (or I slice) is subjected to energy change according to the bit value, the reference frame group should be made to include the I picture. Of course, according to an embodiment, in the case that the reference frame group and the frame group encoded with the bit value are maintained the same in number of frames, the following requirement is spontaneously satisfied: if the frame group encoded with the bit value is set to include one I picture, the reference frame group also should include one I picture.

In an embodiment, in assigning the bit of watermark payload, a condition on whether the reference frame group is assigned or not (consecutive mode) may be also set in the controller 100 through the user interface unit 130. The controller 100 sets the thusly set consecutive mode or non-consecutive mode (reference frame group allocation mode) in the watermarking unit 110 so that encoding of the watermark payload bit into the image frame is carried out.

Figure 14:
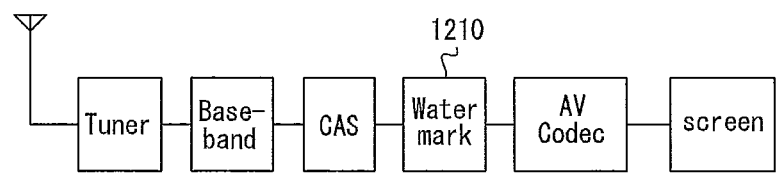
Figure 15:
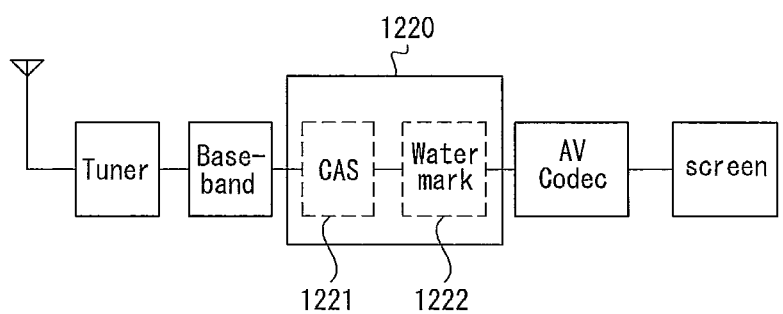

After encoding of each bit in the watermark payload, the watermarking unit 110 inversely performs the overall pre-processing procedure to obtain the blocks for frequency coefficients with respect to the image frames having frequency coefficients whose values are selectively varied, thus completing and outputting image data having the same format as the digitally compressed image data. An example of the afore-mentioned pre-processing procedure will be described in greater detail with reference to FIGS. 17 and 18. In an embodiment, when watermarking is performed at the foremost end of the AV codec decoding and outputting the digitally compressed image data, the complete image data is applied to the AV codec. The device shown in FIG. 3 may be implemented independently or as a part level 1210 in a device performing other functions as shown in FIG. 14, e.g., a digital set-top box. When the device is implemented as a part level of another device, the functions of the controller 100 may be incorporated into the controller of the other device. As shown in FIG. 15, the watermarking function unit 1222 may be implemented in a chip 1220 integrated with a part having other functions, e.g., the CAS function unit 1221.

On the other hand, the afore-mentioned pre-processing procedure and its inverse procedure which are performed before or after watermarking by the watermarking unit 110 (or the watermarking function units 1210 and 1222 as part levels shown in FIG. 14 or 15) differ depending on the format of the digitally compressed image data as input. Hereinafter, the pre-processing procedure and its inverse procedure for two formats are described. However, the present invention is not limited to the conditions and/or examples described below, and any embodiments may be included in the scope of the present invention as long as they employ the configuration of the above-described watermark payload and the concept and principle of the encoding as the image frame.

Figure 16:
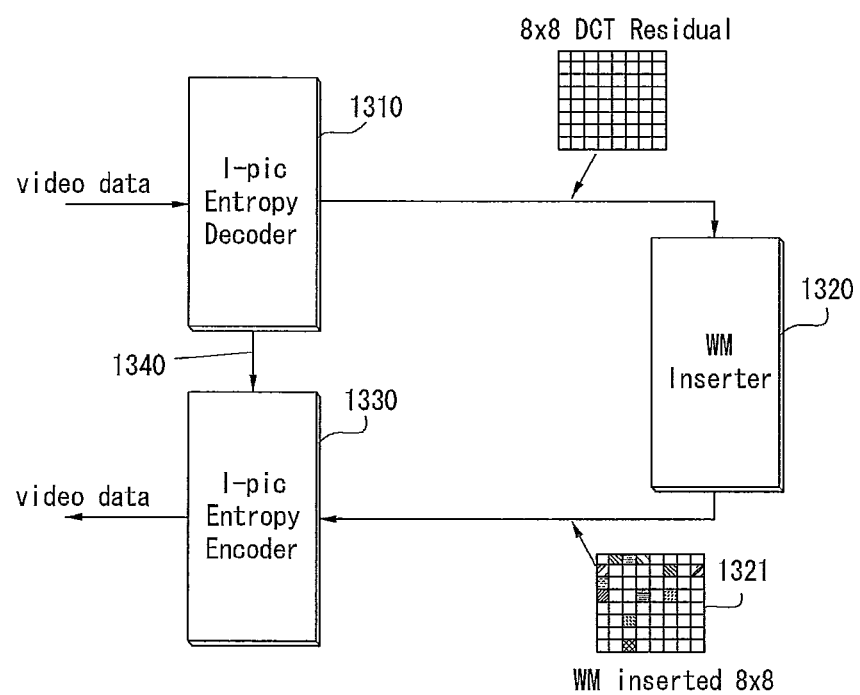
FIG. 16 illustrates an exemplary configuration of a means of embedding watermark data into MPEG-2 format digital compressed image data according to an embodiment of the present invention.

First, in the case that the digitally compressed image data supplied to the watermarking unit 110 (or the watermarking function units 1210 and 1222 as part levels shown in FIG. 14 or 15) has an MPEG-2 format, as shown in FIG. 16, the watermarking unit 110 may include an I picture entropy decoder 1310, a watermark inserting unit 1320, and an I picture entropy encoder 1330. The I picture entropy decoder 1310 performs a pre-processing procedure, including decoding data information compressed according to a probability of code generation from the digitally compressed image data to output image data corresponding to the I picture. The image data includes frequency component coefficients, e.g., DCT coefficients. The watermark inserting unit 1320 outputs watermark-inserted I picture 1321 by changing or maintaining the I picture DCT coefficients input from the I picture entropy decoder 1310 by a selected one or a combination of the above-described methods. The I picture entropy encoder 1330 performs entropy encoding on the I picture output from the watermark inserting unit 1320 based on a predetermined method to convert the I picture into the digitally compressed data originally input to the I picture entropy decoder 1310. In the sequential procedures of the entropy encoding, watermark inserting, and entropy decoding, the digitally compressed data belonging to the picture (P or B picture) other than the I picture is bypassed by the I picture entropy decoder 1310 (1340) and transferred to the I picture entropy encoder 1330, and the I picture entropy encoder 1330 inserts the compressed data of the I picture compressed on its own into a corresponding position of the bypassed digital compressed data, thus outputting the original digital compressed image data.

Figure 17:
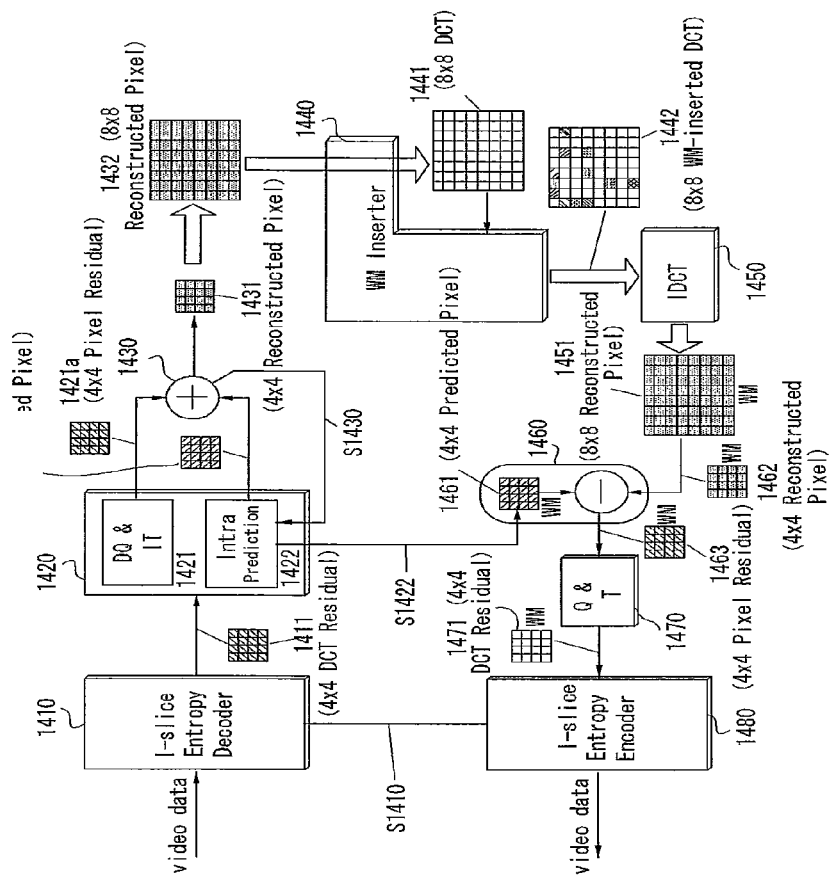
FIG. 17 illustrates an exemplary configuration of a means of embedding watermark data into H.264/AVC format digital compressed image data according to an embodiment of the present invention.

Next, an example where the digital compressed image data applied to the watermarking unit 110 (or the watermarking function units 1210 and 1222 as part levels shown in FIG. 14 or 15) has an H.264/AVC format is described. The H.264/AVC format uses intra prediction during the course of information compression. The intra prediction predicts DC values from the surrounding blocks upon encoding and encodes the DC value of a current block. That is, a mode may exist in one slice, wherein in the mode one block depends upon an adjacent block that comes ahead of the block. Accordingly, in case of simply converting the transform coefficient of one block to insert a watermark bit, the change in the coefficient may be unintentionally reflected onto the blocks that come behind in one slice when it comes to cording order. In consideration of the features of this encoding method, an embodiment decodes the I slice into the image signal then performs DCT on the image signal. Of course, in the course of the DCT procedure, change of DCT coefficient is performed according to the watermark payload bit. FIG. 17 shows an exemplary configuration of the watermarking unit 110 according to an embodiment, the watermarking unit 110 including an I slice entropy decoder 1410, an intra decoder 1420, a pixel adder 1430, a watermark inserting unit 1440, an inverse converter 1450, an intra predictor 1460, and an I slice entropy encoder 1480.

The I slice entropy decoder 1410 decodes the data information compressed from the input digital compressed image data based on the probability of code generation and outputs image data corresponding to the I slice. The image data includes frequency component coefficients, e.g., DCT coefficients. The intra decoder 1420 performs inverse quantization and inverse transform on each macro block of the input slice in the sub block unit of 4×4 and converts the block into a sub block 1421a having a pixel residual value. On the other hand, depending on the type of the intra prediction mode of the sub block, the sub block 1422a having a predicted pixel value for the sub block is configured from a pixel value of a previously restored adjacent sub block (1422). The pixel adder 1430 adds the pixel value of the predicted sub block 1422a to the pixel residual value of the sub block 1421a for restoration into the sub block 1431 having the original pixel value. The sub block having the thusly restored pixel value may be used for restoring the pixel value of its subsequent sub block (S1430). The watermark inserting unit 1440 performs DCT on the 8×8 block 1432 consisting of the restored 4×4 sub blocks thus completing the afore-mentioned pre-processing procedure. With respect to the 8×8 block 1441 having the converted DCT coefficient as obtained by completing the pre-processing procedure, a selected one or a combination of the above-described methods is performed to change or maintain the DCT coefficients in the block, thus outputting the 8×8 block 1442 having the watermark payload bit inserted, and the inverse converter 1450 performs IDCT on the watermark payload bit-inserted 8×8 block 1442 thus converting the block into the block 1451 of the pixel value. The intra predictor 1460 divides the block 1451 of the pixel value into 4×4 sub blocks and uses the original intra prediction mode type for each divided sub block as is (S1422) to form a block 1461 of the predicted pixel value from an adjacent sub block, then deducts the pixel value of the predicted block from the pixel value of the sub block 1462, thus outputting the pixel residual sub block 1463. The pixel residual sub block 1463 is sequentially output from the intra predictor 1460, and undergoes DCT and quantization in the intra encoder 1470, and is then supplied to the I slice entropy encoder 1480 as the DCT residual sub block 1471. The I slice entropy encoder 1480 conducts entropy encoding on data of the input DCT residual sub block and inserts the compressed data of the I slice compressed on its own into the digital compressed data S1410 which does not belong to the I slice and is thus bypassed by the I slice entropy decoder 1410, thus outputting the original digital compressed image data.

It has been described in connection with FIGS. 16 and 17 that in the watermark data encoding methods the transform coefficients for frequency components are selectively changed only on the I picture or slice in the input image data. However, according to the present invention image re-encoding procedure also applies to the picture or slice encoded in the inter mode, so that the transform coefficients obtained in the interim procedure. Accordingly, the present invention is not limited as selective adjustment of the transform coefficients on the I picture or slice which is described as an embodiment for convenience of implementation.

According to one or a combination of the above-described embodiments, image data encoded so that watermark payload is repeated consecutively or at a constant cycle is transferred to another device which in turns decodes the encoded image data, then outputs or records the decoded image data.

Hereinafter, a method of detecting a watermark from image content which is obtained by capturing an image displayed on the screen or is transferred to another device will be described in greater detail. In the watermark detection procedure, for better understanding, limited embodiments are specifically described, wherein the description on the detection method of the encoded watermark may be omitted based on one or a combination of the above-described encoding methods. However, in consideration of the specific detection principle to be described below as well as the inverse procedure of the above-described encoding method, the omitted description on the detection method of the watermark may be apparently understood. Accordingly, although no specific description on the detection method of the watermark is provided, any embodiments regarding detection of the watermark based on inverse procedure of the above-described watermark encoding methods are included in the scope of the present invention.

Figure 18:
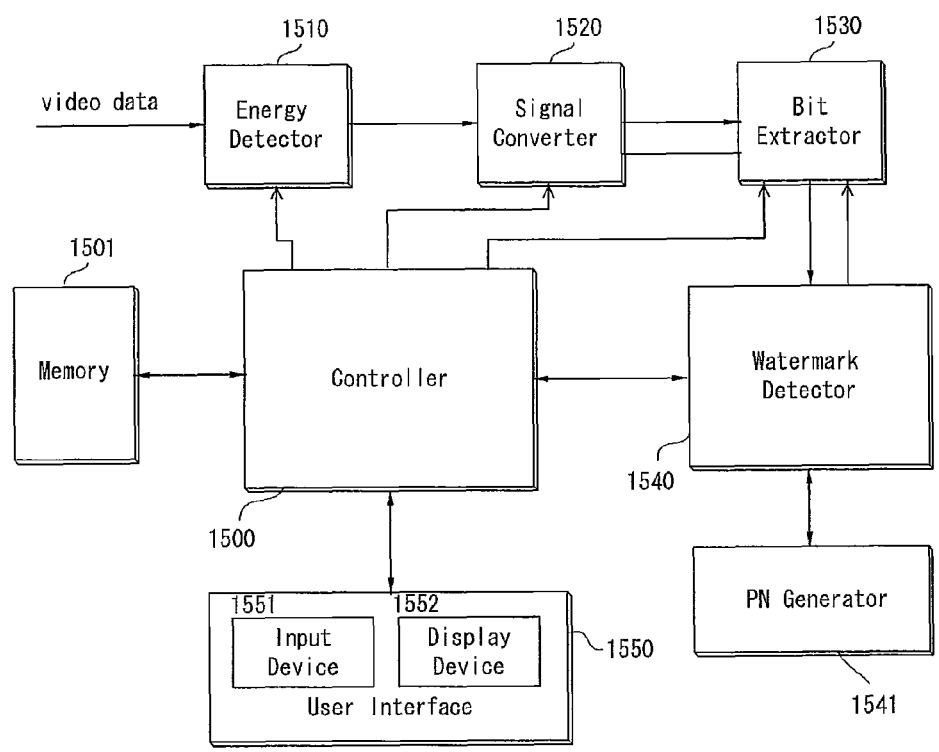
FIG. 18 illustrates an exemplary configuration of a watermark data detecting apparatus according to an embodiment of the present invention.

FIG. 18 is a block diagram illustrating a detection device of watermark data according to an embodiment of the present invention, the detection device including an energy detector 1510 detecting energy of the frequency component of an input image signal, a signal converter 1520 converting an energy level signal output from the energy detector 1510 and outputting the resultant signal according to a predetermined method, a bit extractor 1530 detecting a bit sequence encoded with the watermark data from the signal from the signal converter 1520, a PN generator 1541 generating a predetermined PN sequence or storing a table of a predetermined PN sequence, a watermark decoder 1540 decoding watermark data by applying the PN sequence provided from the PN generator 1541 to the bit sequence from the bit extractor 1530, a user interface 1550 performing input/output with a user, a controller 1500 controlling the overall operation of the components, and a memory 1501 storing data for performing the watermark detection operation. The user interface 1550 includes an input device 1551, such as a key board, mouse, or touchpad, for receiving a user's input, and a display device 1552 for displaying a proper input guide image and/or processing state to a user. The PN generator 1541 provides the same PN sequences as one or more PN sequences used by the PN supplying unit 120 shown in FIG. 3 to the watermark decoder 1540.

Figure 19:
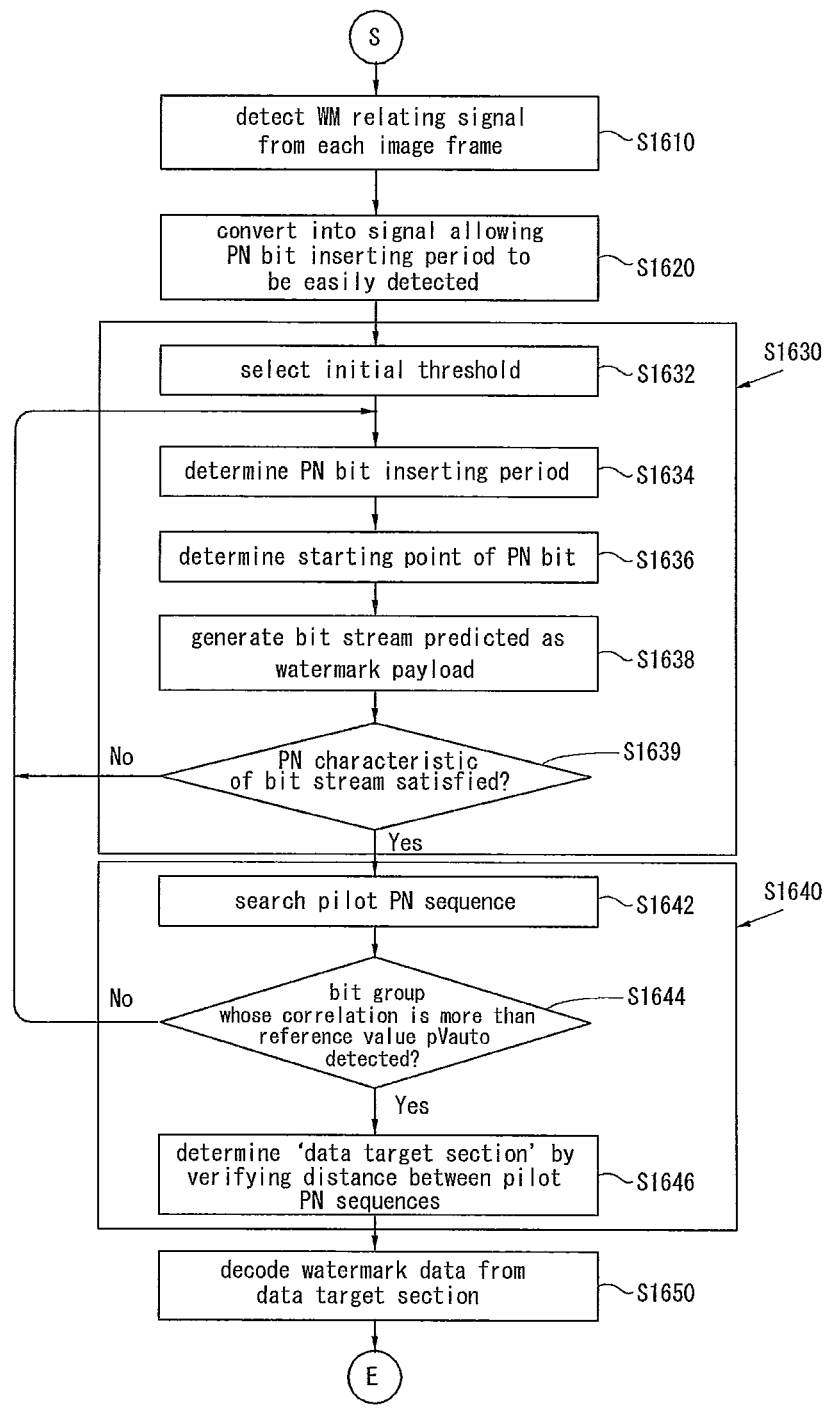
FIG. 19 is a flowchart illustrating a watermark data detecting method according to an embodiment of the present invention.

The device shown in FIG. 18 detects watermark data from the input image signal according to a detection method illustrated in FIG. 19. Hereinafter, the operation of the device of FIG. 18 is described in detail together with FIG. 19.

The energy detector 1510 detects a watermark relating signal from each frame of an input image signal (S1610). The detected signal reflects the frequency coefficients defined by one or a combination of the areas 801, 802, 803, and 804 which are promised to be used in relation with watermarking in each block of the frame shown in FIG. 10. A sum or an average of the coefficients is output from the energy detector 1510, the sum or average reflecting the intensity or energy (hereinafter, simply referred to as "energy") of the corresponding frequency component. Since in the afore-described watermarking method energy increases with respect to watermark bit '1', a signal having a higher energy level is output in the corresponding frame group. In the case that the input image signal is digital compressed image data, the energy detector 1510 performs entropy decoding to identify the frequency coefficient of each frame thus conducting the afore-mentioned energy detection. In the case that the input image signal is an analog image signal, the energy detector 1510 transforms the input signal into a frequency domain, e.g., performs DCT on the input signal, to identify the frequency coefficient of each frame. Alternatively, the energy detector 1510 may directly detect the energy level of a specific frequency band (the frequency band corresponding to each or a combination of the areas shown in FIG. 10) of the analog signal.

In the embodiment described in connection with FIG. 13, since the reference frame group having no watermark payload bit inserted therein is provided, in the image signal encoded with the watermark according to the embodiment described in connection with FIG. 13, the period of inserting the watermark bit becomes two frame groups. In the case of the embodiments (FIGS. 11 and 12) in which no reference frame group is provided, the time section of one frame group will be the period of inserting the watermark bit. Hereinafter, a method of detecting a watermark according to an embodiment is described under the assumption of reception of an image signal encoded with watermark data according to the embodiment described in connection with FIG. 13. Of course, the principle of the following detection method may also apply to other embodiments (FIGS. 11 and 12) for detection of watermark data.

Figure 20:
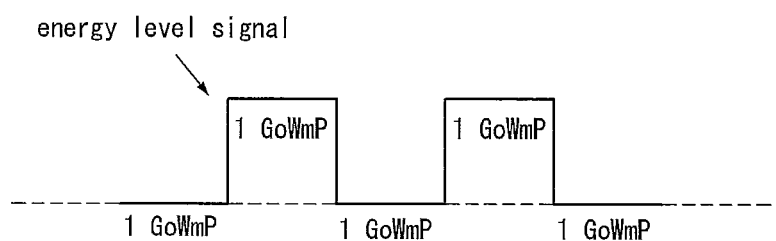
FIG. 20 illustrates the theoretical waveform of an energy level signal detected from watermark-embedded content according to an embodiment of the present invention, FIGS. 21 and 22 respectively illustrate theoretical waveforms of energy level signals detected from watermark-embedded content and energy ratio signals induced therefrom according to an embodiment of the present invention.
Figure 21:
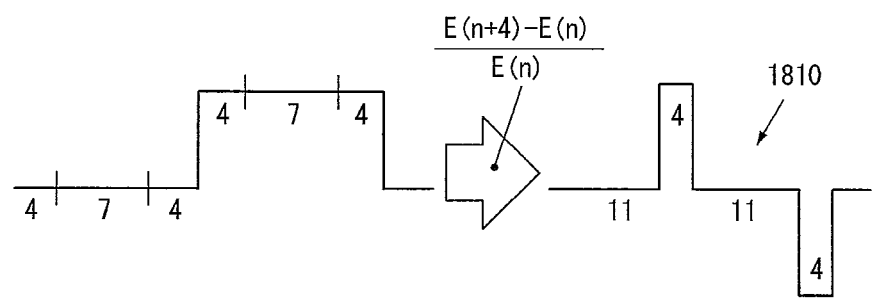
Figure 22:
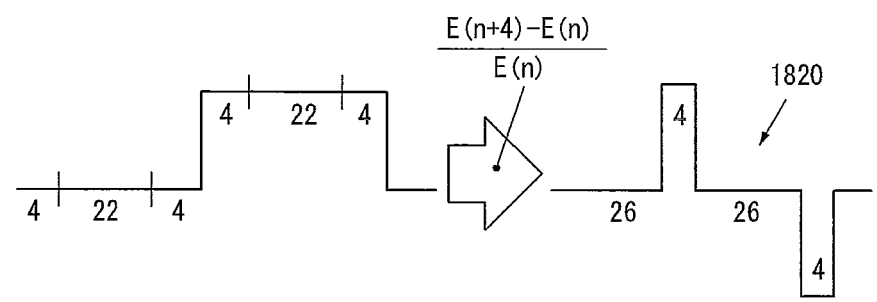
Figure 23:
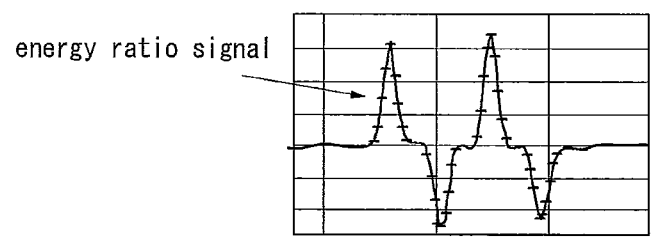
FIG. 23 illustrates an actual waveform of an energy ratio signal induced from an energy level signal obtained from watermark-embedded content according to an embodiment of the present invention.

For convenience of description, frame groups belonging to the bit period of the watermark payload are referred to as "GoWmP" (Group of Watermarked Pictures). The energy level signal output from the energy detector 1510 should theoretically have the signal waveform as shown in FIG. 20, but due to differences in characteristics, such as brightness of the image signal, when the watermark is detected, it is difficult to obtain the signal having a waveform similar to that shown in FIG. 20. Accordingly, the signal converter 1520 generates a ratio signal of a moving average of energy from a signal output from the energy detector 1510 to be more easily aware of a change in energy level for each period of inserting the watermark data bit (S1620). FIGS. 21 and 22 show examples of theoretical waveforms of the energy ratio signal transformed and output by the signal converter 1520. In an embodiment, an energy ratio among four image frames, i.e., $\{E(n+4)-E(n)\}/E(n)$ or $E(n+4)/E(n)$ (where, n is a frame number in order), is chosen. However, as the inter-frame ratio, other ratios may be selected depending on watermark encoding and/or detection environment. FIG. 21 shows an example where GoWmP is 15, and FIG. 22 shows an example where GoWmP is 30. Since a ratio among four frames is selected, as shown in FIGS. 21 and 22, signals 1810 and 1820 output from the signal converter 1520 have peaks with sections corresponding to approximately four frames corresponding to shift sections where energy level changes and have a flat signal level for the remaining section. Unlike the theoretical waveforms shown in FIG. 21 or 22, an actual energy ratio signal output from the signal converter 1520 has a waveform whose slope is slightly slow at the peak or boundary. Nonetheless, the bit extractor 1530 may determine whether '1' or '0' is inserted into the corresponding signal more easily than the energy level signal by applying upper and lower thresholds to the upper and lower peaks with respect to the signal obtained in FIG. 23.

The bit extractor 1530 performs a step (S1630) of extracting bits constituting the watermark data, i.e., PN sequence bits, from the energy ratio signal. For this, the bit extractor 1530 selects initial upper and lower thresholds (S1632), determines the inserting period of each bit of the bit sequence including one or more PN sequences (S1634), and determines a signal point where the watermark payload starts or the start frame (S1636). First, a method of determining the initial upper and lower thresholds according to an embodiment is described in detail. In an embodiment, a cumulative distribution is used. In the case that the inserting period of the watermark payload bit (i.e., PN sequence bit, hereinafter, simply referred to as "PN bit") is two GoWmPs (in this case, one GoWmP is used as the reference frame group), if GoWmP=15, as shown in FIG. 21, the cumulative distribution for a portion lifted upward becomes 4/30=14%. Accordingly, the bit extractor 1530 samples the input energy ratio signal with a period even shorter than a period (commonly 1/30 sec) of the image frame, sorts the sampled values in order of size, and accrues the values in descending order. If the accrued value reaches 26% or 14%, the bit extractor 1530 determines the corresponding sampled value as the initial upper threshold (S1632). The same method may be applied to determination of the initial lower threshold. The above-described determination method using 26% or 14% may be available when the inserting period of the PN bit is known. In another embodiment, when the inserting period of the PN bit is not known, the reference of the cumulative distribution number is determined as a value between 7% and 26%, preferably 15%. Since the reference of the cumulative distribution number is drawn under the assumption that GoWmP is not in excess of 60 frames and the inter-frame difference (kf) for conversion into the energy ratio signal (in equation: {E(n+kf)−E(n)}/E(n) or E(n+kf)/E(n)) is 4, when GoWmP and Kf have different values, the different values are applied to the above calculation principle, thus determining a proper reference value for cumulative distribution. Then, the reference value may be applied to the cumulative distribution number, so that the initial upper and lower thresholds are determined (S1632). Any value determined to be proper may be used as the initial values because once the inserting period of the PN bit and a frame where the PN bit starts, i.e., the start point, are properly found, the precise thresholds can be adaptively reset. This procedure will be described later.

Figure 24:
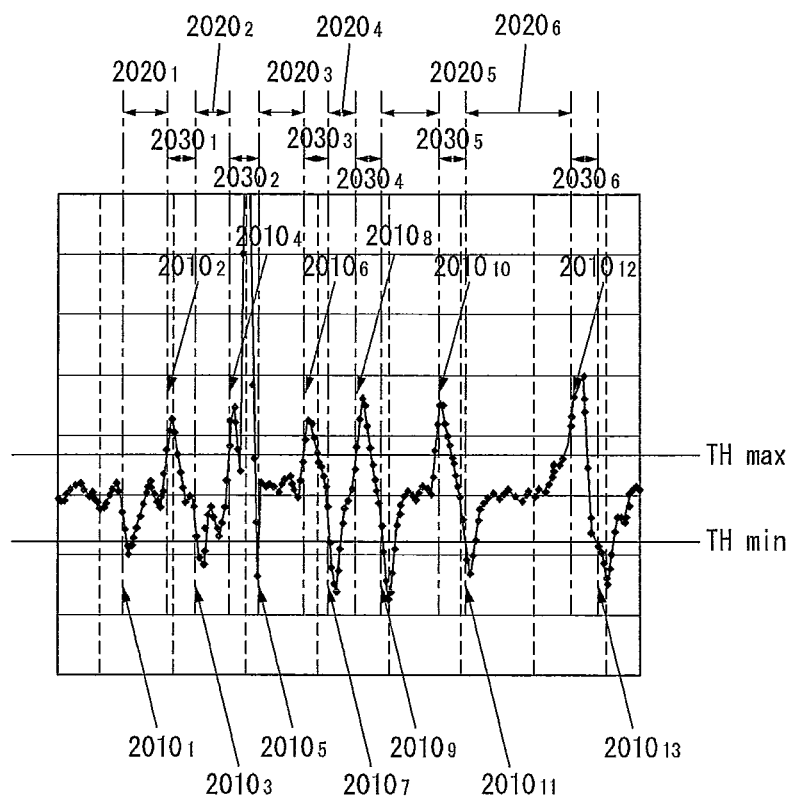
FIG. 24 illustrates an example of splitting an energy ration signal obtained from watermark-embedded content to restore bit values from the energy ratio signal according to an embodiment of the present invention.
Figure 25:
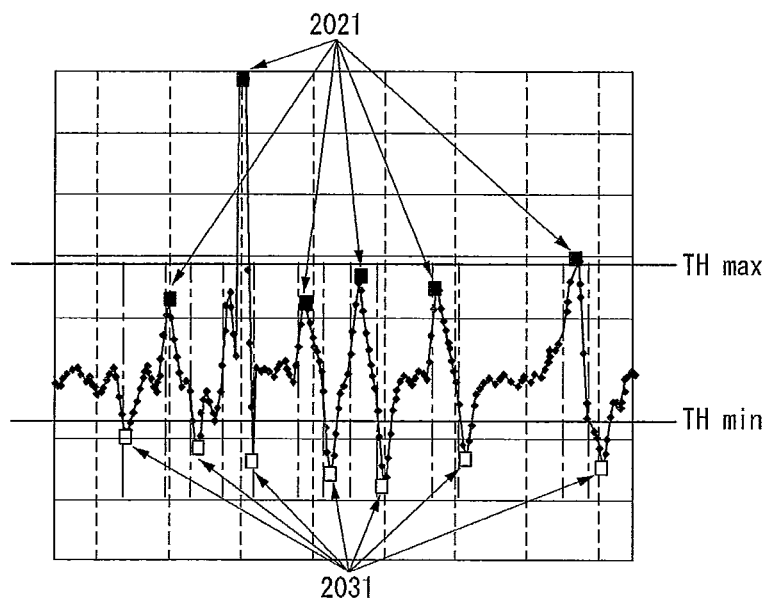
FIG. 25 illustrates boundary points of a bit prediction section over an energy ratio signal obtained from watermark-embedded content according to an embodiment of the present invention.

Next, the bit extractor 1530 grasps the inserting period of the PN bit based on the determined initial upper and lower thresholds. For this, the bit extractor 1530 splits the energy level ratio signal into each section based on points crossing the determined upper and lower thresholds. FIG. 24 exemplifies that the energy ratio signal is split by this method. In FIG. 24, there are split sections $2020_p$ and $2030_p$ before or after the reference line $2010_r$ for points where the energy ratio signal crosses the upper and lower thresholds THmax and THmin. In each split section, a high level drawing section $2030_p$ is present from a point upwardly crossing the upper threshold THmax to a point downwardly crossing the lower threshold THmin, and a low level drawing section $2020_q$ is present from a point downwardly crossing the low threshold to a point upwardly crossing the upper threshold. After splitting the energy ratio signal into the sections, the bit extractor 1530 extracts a lowest point from the low level drawing section $2020_q$ and extracts a highest point from the high level drawing section $2030_p$. FIG. 25 shows the lowest points 2031 and the highest points 2021 as extracted by this method. When the highest and lowest points are grasped, the bit extractor 1530 calculates and stores temporal intervals between adjacent highest points or between adjacent lowest points (hereinafter, the temporal intervals are referred to as "bit prediction sections"), then checks into the stored temporal intervals, determining a temporal interval with highest frequency as the PN bit inserting period BP (S1634).

In an embodiment, temporal intervals between adjacent high and lowest points are extracted, and statistics of the temporal intervals are obtained, then a temporal interval with lowest frequency may be determined as the PN bit inserting period. In an embodiment, since the bit inserting period predicted to be determined becomes one frame group, in the case of watermarking illustrated in FIG. 13, in which the reference frame groups $1120_1$, $1120_2$ are inserted as the watermark data, the signal section corresponding to the reference frame group is discerned as one bit section. Accordingly, in an embodiment, in the case of the embodiment illustrated in FIG. 13, the bit extractor 1530 deserts one bit whenever allocating a bit value to each section split on a per-determined bit period basis from a start point (start frame) which is to be determined later, thus generating a final bit sequence.

In an embodiment, the inserting period of the PN bit may be input by a user through the user interface 1550. The PN bit inserting period set through the input device 1551 of the user interface 1550 is set to the bit extractor 1530 by the controller 1500 and used. In an embodiment, even when the PN bit inserting period is set from an outside, the bit extractor 1530 may automatically perform the determination of the PN bit inserting period and suggest the determined PN bit inserting period to the user through the user interface 1550, so that the user may be aware of accuracy of the inserting period or reliability of automatic detection.

Figure 26:
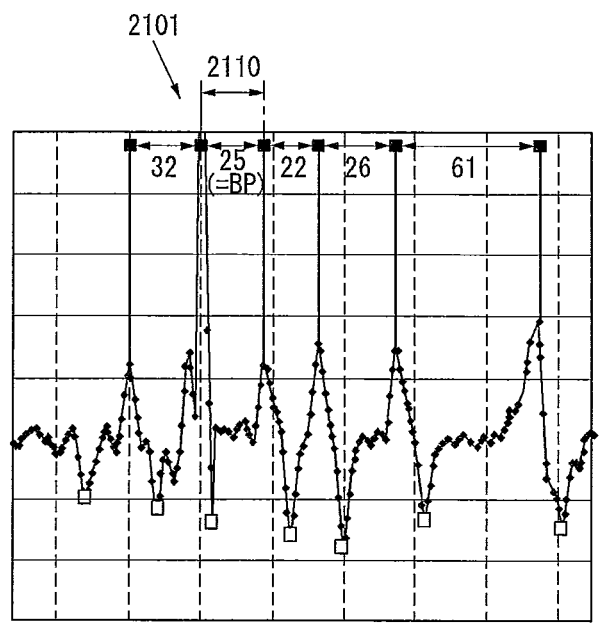
FIG. 26 illustrates an example of determining a start point and bit inserting period for restoring a bit sequence from an energy ratio signal obtained from watermark-embedded content according to an embodiment of the present invention.
Figure 27:
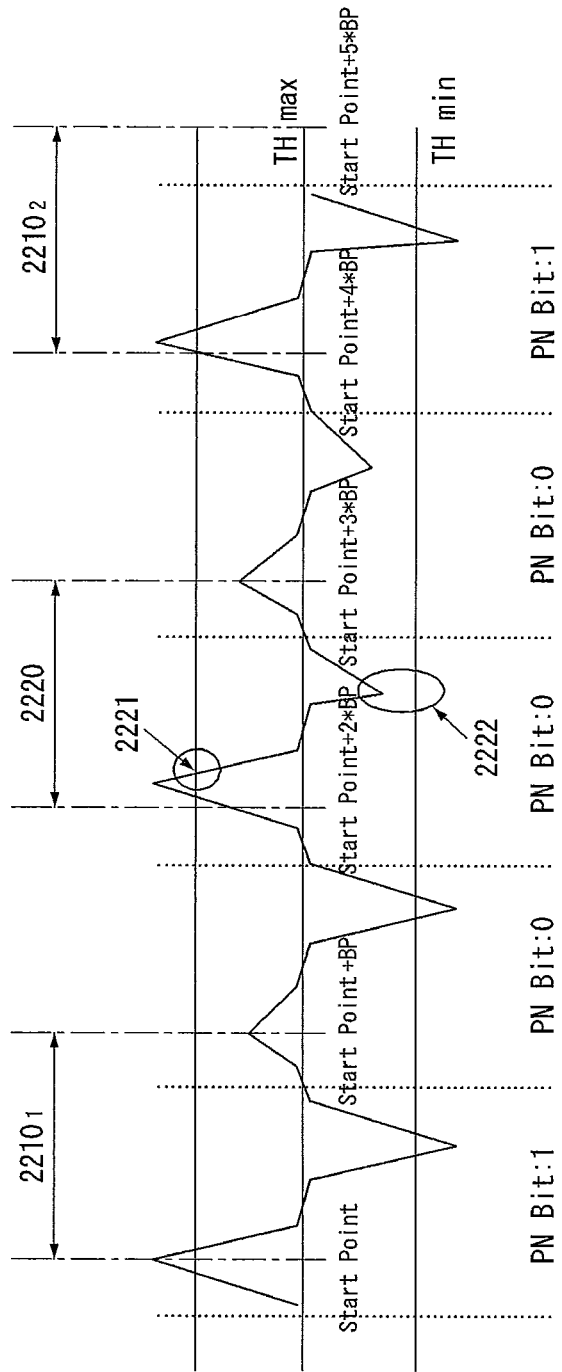
FIG. 27 illustrates an example of assigning bit values depending on a determined bit inserting period with respect to an energy ratio signal obtained from watermark-embedded content according to an embodiment of the present invention.

After the PN bit inserting period is determined, the bit extractor 1530 determines a point (or an image frame corresponding to the point) where the PN sequence is predicted to start (S1636). The determined start point (frame), as shown in FIG. 26, becomes the start point 2101 of the bit prediction section 2110 having the time section conforming to the determined PN bit inserting period BP. In FIG. 26, when the determined PN bit inserting period BP is a time corresponding to 25 frames, a section start point (or its corresponding frame) of the bit prediction section having the time section corresponding to the 25 frames is determined as the start point for allocation of the bit value. If the start point is thusly determined, the bit extractor 1530 allocates a bit value at each period from the start point. At this time, when there is a point downwardly crossing the upper threshold (from top to down) within the inserting period, '1' is allocated, and otherwise, '0' is allocated (S1638). Of course, according to an embodiment, since watermark encoding for increasing energy with respect to '0' may be conducted, the bit value may be allocated in an opposite manner of the above-described method. In an embodiment, in the case that a reference frame group is inserted between PN bits, when the bit value is determined at every bit inserting period as shown in FIG. 27, '1' is allocated only to a period 2210j in which there are all of the points crossing the upper and lower thresholds within the inserting period, and '0' is otherwise allocated. In FIG. 27, since in the third period 2220 there is a point 2221 downwardly crossing the upper threshold but not any point crossing the lower threshold (2222), '0' is allocated. In this way, the bit extractor 1530 generates the bit sequence predicted as the watermark payload (S1638).

In an embodiment, a point where the watermark payload is predicted to start may not be determined by the method illustrated in FIG. 26. A bit sequence is generated by allocating a bit value at every bit inserting period in the afore-described method while moving the section from any point (i.e., its corresponding image frame) on a per-frame basis or while moving the section on per-bit prediction section basis, and then, a point where the optimum result is made by a PN sequence detection process over the bit sequence to be described later may be determined as the start point of the PN sequence.

Figure 28:
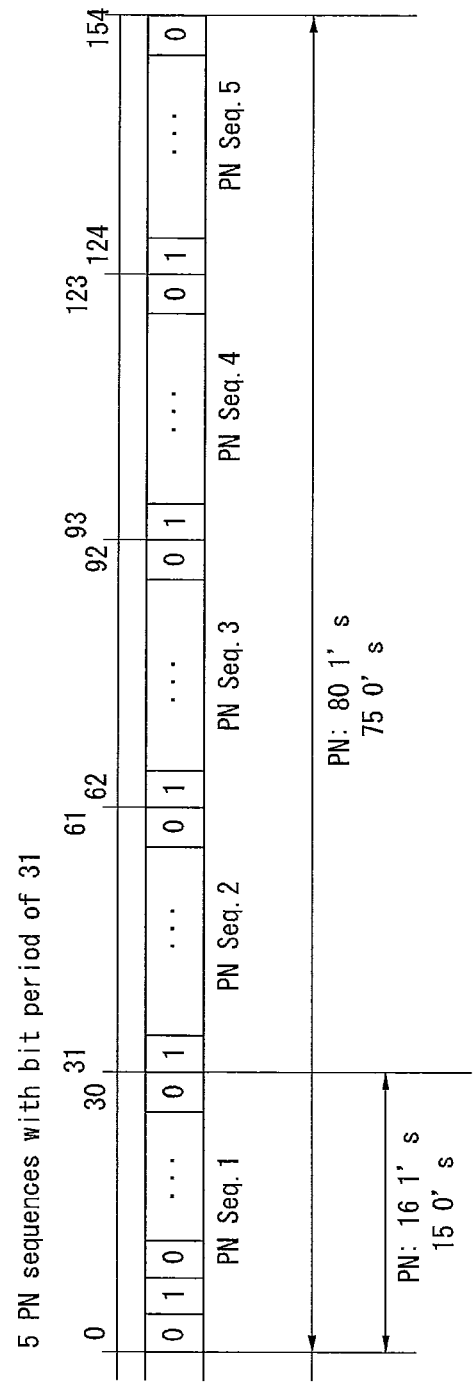
FIG. 28 illustrates an example of a characteristic of difference in number between 1's and 0's of a band spreading code used for watermarking according to an embodiment of the present invention.

The bit extractor 1530 generates a bit stream, i.e., bit sequence, which is predicted as the watermark payload in the above-described procedure, and then evaluates accuracy and/or reliability of whole or part of the bit sequence. For this, a bit value characteristic (the number of 1's is equal to the number of 0's plus 1) of the PN sequence is used. For example, in the PN sequence whose period is 31, sixteen 1's and fifteen 0's are present. Accordingly, as shown in FIG. 28, in case of a bit sequence corresponding to five PN sequences having a bit period of 31 as output from the PN generator with a bit size of 5, the number of 1's is supposed to be 80, and the number of 0's is supposed to be 75. Thus, the bit extractor 1530 allocates the bit value to the PN bit inserting period in the above-described method to identify whether whole or part of the generated bit sequence satisfies the characteristic (S1639). At this time, the requirement may have an error range. For example, a condition for difference in number between 0's and 1's may be set as not 1 but $N_L$ ($N_L$=2, 3, . . . ). Unless the condition is met, the initially set upper and lower thresholds are adjusted and the afore-mentioned procedures (determination of PN bit inserting period, determination of start point, and generation of bit sequence) are performed again. The size of the bit stream evaluated by the bit extractor 1530 for accuracy and/or reliability of bit extraction may be a preset value, or may be set as the number of the PN sequences through the user interface 1550. If the characteristic in the difference in number between 0's and 1's satisfies the predetermined condition, the bit extractor 1530 applies the generated bit sequence to the watermark decoder 1540. Even after output of the bit sequence, the bit extractor 1530 keeps storing all the information (input energy ratio signal, finally set upper and lower thresholds, etc.) obtained during acquisition of the bit sequence in order for the watermark decoder 1540 to prepare for when no PN sequence having a desired correlation is determined.

In an embodiment, to compensate for a PN sequence characteristic of being vulnerable to a temporal error (such as losses), as shown in FIG. 7 or 8, pilot PN sequences are inserted at a constant interval. Thus, the watermark decoder 1540 performs a step (S1640) of finding a watermark data section and part of the pilot PN sequence for an input bit sequence. When watermarking is performed according to the embodiment illustrated in FIG. 6, in which no pilot PN sequence is inserted into the watermark, the step of finding the pilot PN sequence is omitted, and a PN sequence encoded with watermark data (hereinafter, referred to as "data PN sequence") is found, then a step (S1650) of decoding the watermark data is immediately performed. To find part of the pilot PN sequence over the input bit sequence, the watermark decoder 1540 moves over the input bit sequences bit by bit applying the pilot PN sequence provided from the PN generator 1541, so as to find a bit group exhibiting the highest auto-correlation value (theoretically, a value corresponding to the PN sequence period) as shown in FIG. 5 (S1642). The found bit group has a bit stream estimated to have the same bit values as the pilot PN sequence. In the case that watermarking is done as shown in FIG. 6, one or more data PN sequences promised to use upon encoding of the watermark data instead of the pilot PN sequence are used. In the case of performing phase shift using quantized shift amounts upon encoding, each used data PN sequence is shifted on a predetermined basis and a correlation value is detected over an input bit sequence, thus drawing a data PN sequence exhibiting the auto-correlation value and its phase. On the other hand, the PN sequence used by the watermark decoder 1540 is provided from the PN generator 1541.

Figure 29:
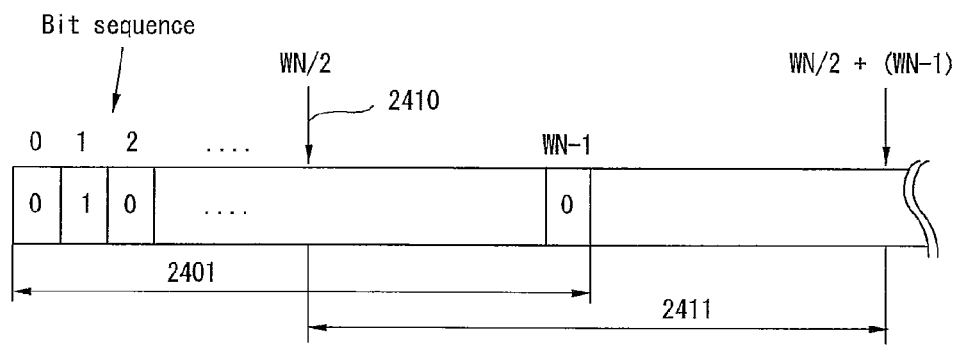
FIG. 29 illustrates an example of selecting a target section for detecting correlation of a band spreading code from a bit sequence generated by allocating bit values based on a determined bit inserting period according to an embodiment of the present invention.

To detect the pilot PN sequence, the watermark decoder 1540 sets a target section having at least one pilot PN sequence over the input bit sequence from the bit extractor 1530 to perform the detection of the correlation value. For this purpose, the watermark decoder 1540 sets the bit size of the target section to be equal to or more than WN (=(bit count of PN sequence period)*(the number of PN sequences used for watermark data encoding)) as shown in FIG. 29, and the bit extractor 1530 also extracts the bit sequence having a size equal to or more than at least WN and applies it to the watermark decoder 1540. In some cases, even within the section of the WN size no pilot PN sequence may be detected. This may happen because the pilot PN sequence is present over the boundary region of the target section of the set WN bit size. Accordingly, if no bit group having a value corresponding to the auto-correlation within the target section 2401 having the initially set WN bit size is detected, the watermark decoder 1540 sets a new target section 2411 starting from a point 2410 corresponding to half of the target section, then finds the pilot PN sequence. For this, the bit extractor 1530 extracts the bit sequence having the bit count of at least 1.5*WN (preferable 2*WN) from the input energy ratio signal and applies to the watermark decoder 1540, and the watermark decoder 1540 performs the afore-mentioned procedures on the input bit sequence, i.e., the PN sequence bit stream.

In an embodiment, if no bit group having a predetermined correlation value or more is detected over the input bit sequence despite the above procedures (S1644), a feedback procedure (S1645) is performed. At this time, the watermark decoder 1540 notifies a failure of PN sequence detection to the bit extractor 1530 and the bit extractor 1530 thus re-extracts the bit sequence through adjustment of the upper and lower thresholds on the energy ratio signal as stored previously and adjustment of signal section for bit extraction.

Figure 30:
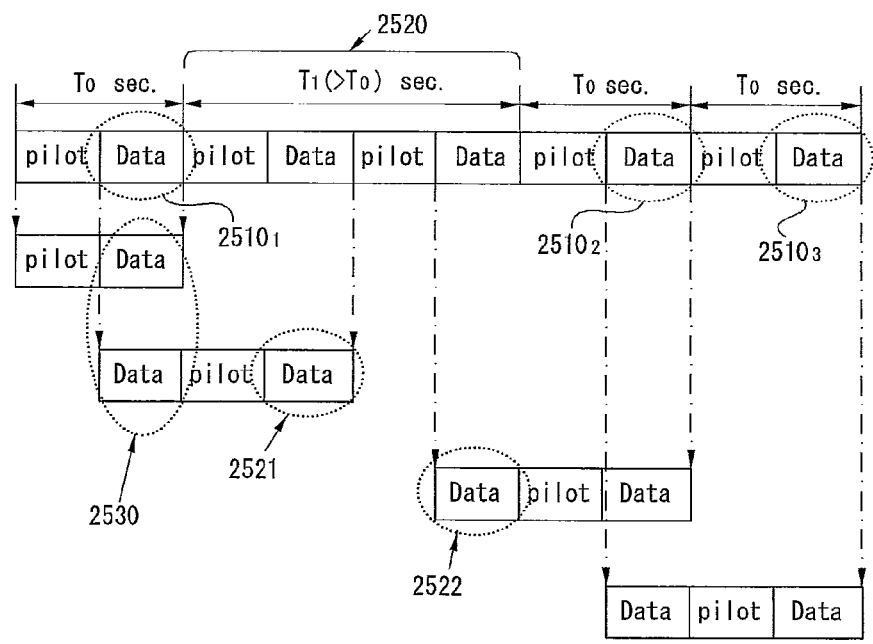
FIG. 30 illustrates an example of using bit sections between sync band spreading codes as sections for detection of watermark data based on the sync band spreading code (pilot PN sequence) detection interval according to an embodiment of the present invention.

In an embodiment, if plural bit groups corresponding to the pilot PN sequence are detected through the above-described procedures, the watermark decoder 1540 verifies the distance between the pilot PN sequences detected over the input bit sequence thus determining a PN sequence bit section corresponding to the data PN sequence to be used for watermark decoding (S1646). This is done to identify whether a temporal error has occurred in the watermark data loaded on the image signal. If a temporal error has occurred, wrong watermark information may be detected from the erroneous PN sequence. This error can be avoided by the verification. As shown in FIG. 30, if the pilot PN sequence is inserted so that a temporal interval of $T_0$ sec is maintained, the watermark decoder 1540 verifies whether the temporal interval between the detected pilot PN sequences is T0 which is within a permissible error range. If the temporal interval is T0 which is within the permissible error range, one or more data PN sequences 2510k in the corresponding time section are identified as error-free PN sequences and used as a PN sequence section for decoding the watermark data, and otherwise, a temporal error is deemed to have occurred, so that one or more data PN sequences in the corresponding time section 2520 are not used for watermark data decoding. In an embodiment, the bit stream in the time section 2520, which is determined to have caused a temporal error, may also be used for decoding the watermark data with respect to each bit group 2521 or 2522 corresponding to the length of the watermark payload or PN sequence period immediate after and/or before the detected pilot PN sequence. In an embodiment, if the time interval reaching the next pilot PN sequence is longer than T0, a time interval reaching its subsequent pilot PN is identified, and the identified temporal interval is appropriate (for example, if the temporal interval corresponds to an integer multiple of T0 within the permissible error range), it is used for watermark data decoding with respect to the bit group of the payload data which is within the corresponding section whose temporal interval is longer than T0. FIG. 30 illustrates that the same bit group 2530 is duplicated immediately before and after different pilot PN sequences to exemplify that correlation for one or more data PN sequences is performed with respect to the bit streams before and after the pilot PN sequence, but not exemplifies that the bit group is used in duplicate for detection.

As described above, once the PN sequence section estimated to have a data PN sequence to be used for watermark data decoding (hereinafter, "data target section") is determined, the watermark decoder 1540 performs a watermark data detection procedure (S1650) which will be described below in detail starting from the head of the corresponding data target section. As mentioned above, the watermark decoder 1540 uses one PN sequence sequentially selected from the PN sequences or a previously promised PN sequence as provided from the PN generator 1541 to detect a correlation value for a first bit set from the head bit of the data target section to a bit corresponding to the PN sequence period. This detection procedure is in progress as the PN sequence keeps changing and the phase of the PN sequence keeps shifting until a peak value within a preset permissible range comes out which corresponds to the auto-correlation with respect to any quantized phase shift amount and/or any PN sequence. In the case that the phase shift amount is not subjected to quantization, the correlation value is detected as the phase shift amount of the PN sequence is changed consecutively, i.e., on a per-bit basis. If a peak value approximate to the auto-correlation is detected, a value encoded based on the phase shift amount of the used PN sequence is determined, and a watermark bit group having the value is determined (inverse procedure of 721 in FIG. 9). In other words, if the value corresponding to the auto-correlation is detected from none of the data PN sequences determined to be used, the watermark decoder 1540 identifies whether a peak value corresponding to the auto-correlation is detected performing bit-by-bit phase shift amount while disregarding the quantized phase shift amount. If the peak value is detected, a quantized phase shift amount closest to the phase shift amount is found, and a value corresponding to the quantized phase shift amount is determined as the decoding value. In an embodiment, if no phase shifted PN sequence exhibiting a peak value corresponding to the auto-correlation is detected, the phase shifted PN sequence with the maximum value for all the detected correlation values is determined to correspond to the first bit set, thereby determining the decoding value for the phase and/or PN sequence.

The above procedure is performed on a per-PN sequence period basis in the data target section to determine a plurality of watermark bit groups, thus restoring the watermark data constituted of the bit groups. In the case that the pilot PN sequence is added to every data PN sequence as shown in FIG. 8, the above-described procedure is performed for the subsequent one or more data target sections as well, thus finally restoring the data constituting the watermark.

In an embodiment, after detection of the above-described pilot PN sequence, the bit stream for the section present between the detected pilot PN sequences is extracted again from the energy ratio signal thus obtaining the bit stream of the data PN sequence. For this purpose, the watermark decoder 1540 notifies the bit extractor 1530 of the section corresponding to the detected pilot PN sequence and requests re-extraction of the bit stream corresponding to one or more PN sequences before or after the section. Accordingly, the bit extractor 1530 performs the same procedure as the procedure for drawing the pilot PN sequence (S1632, S2634, S1636, S1638, and S1639) on the previously stored energy ratio signal to extract the bit stream corresponding to the data PN sequence. At this time, the upper and lower thresholds in which the pilot PN sequence has been detected are set as initial values, and the upper and lower thresholds are adjusted until a bit stream properly satisfying the bit characteristic is detected. Since the section for extracting the PN sequence bit stream has been reduced from the beginning, more accurate condition applies so that the bit stream corresponding to the data PN sequence can be extracted more precisely. If the bit stream corresponding to the data PN sequence is extracted by the bit extractor 1530 and received, the watermark decoder 1540 properly inserts the bit stream into a position before and/or after the pilot PN sequence detected before the bit stream to determine a data target section, and performs the above-described watermark data detection procedure (S1650) for the target section, thus decoding the encoded watermark data.

The watermark data corresponding to the watermark payload as restored by the watermark detection procedure is transferred to the controller 1500 that in turn outputs the watermark data through the user interface 1550, so that a user or operator can be aware of the watermark loaded over the target content.

The above-described watermark encoding and detection procedures may also apply to audio or multimedia contents as well as the image signals described as examples. In the case of applying to audio, there might be no element for a temporal reference on the contrary to the image signal having an image frame used as a temporal reference. In such cases, when applying the inventive principle to the audio signal, a watermark bit may be inserted every predetermined time. Also, when the inventive principle applies to the audio signal, with respect to a specific frequency band component difficult for a human to hear, its energy may be increased or inserted with a specific strength according to the bit value of a PN sequence to be encoded.

The above-described embodiments are provided as examples, and it may be understood by one of ordinary skill that a number of variations or modifications may be made to the embodiments without departing from the scope of the appended claims.

The invention claimed is:

1. A method of detecting a watermark from content, the method comprising:
    extracting a level of a frequency component of the content;
    generating a bit sequence by making bit values correspond based on a change in the extracted level;
    identifying a correlation shifting a phase of a band spreading code for the generated bit sequence; and
    identifying a phase shift amount of the band spreading code when the identified correlation is a auto-correlation and determining a bit group having a value corresponding to the identified phase shift amount.

2. The method of claim 1, further comprising determining another bit group having a pre-assigned value for the band spreading code when the identified correlation is the auto-correlation.

3. The method of claim 1, further comprising specifying the same bit section as a sync band spreading code over the bit sequence by identifying a correlation of the sync band spreading code having a constant phase with respect to the generated bit sequence, wherein identifying the correlation shifting the phase of the band spreading code is performed on a bit stream before or after the specified bit section.

4. The method of claim 3, further comprising verifying a temporal interval between a plurality of sync bit sections specified as the same bit section as the sync band spreading code, wherein identifying the correlation excludes at least part of the bit stream present between sync bi sections having a temporal interval departing from a predetermined temporal interval from identifying the correlation shifting the phase of the band spreading code.

5. The method of claim 1, wherein in identifying the correlation, the phase shift amount is selected from $k*2^p$ ($k=0, 1, 2, \ldots, p=1, 2, \ldots$), wherein p is a predetermined fixed value.

6. The method of claim 1, wherein in determining the bit group, when the identified correlation corresponds to a auto-correlation, and unless the phase shift amount of the band spreading code is 0 or an integer multiple of $2^p$ ($p=1, 2, \ldots$), a value closest to 0 or the integer multiple is deemed as the phase shift amount, and a corresponding value is determined.

7. The method of claim 1, wherein generating the bit sequence comprises,
    a first step of converting the extracted level into a level variation ratio,
    a second step of splitting into time sections based on a point where the level variation ratio crosses upper and lower thresholds,
    a third step of determining a bit inserting period based on a temporal interval frequency between upper peaks of the level variation ratio, between lower peaks of the level variation ratio, or between the upper and lower peaks of the level variation ratio in each of the split time sections, and
    a fourth step of applying a bit value at every bit inserting period to generate the bit sequence.

8. The method of claim 7, wherein the fourth step is performed starting from an upper peak value or a lower peak value between upper peak values or between lower peak values, the upper or lower peak values having a temporal interval conforming to the determined bit inserting period.

9. The method of claim 8, wherein in the fourth step, when an upper peak value larger than the upper threshold and a lower peak value smaller than the lower threshold are both present in the determined bit inserting period, a first bit value applies to the inserting period, and otherwise, a compliment number of the first bit value applies to the inserting period.

10. The method of claim 7, in identifying the correlation, when no value corresponding to the auto-correlation is detected, the upper and lower thresholds are adjusted, so that the second step and its subsequent steps are performed again, and wherein in generating the bit sequence, when the generated bit sequence does not satisfy a characteristic of a difference in number between 1's and 0's of the band spreading code, the second step and its subsequent steps are performed again.

11. The method of claim 1, wherein extracting the level of the frequency component includes generating a signal reflecting a size of a coefficient for some regions of each frequency coefficient block of an image frame included in the content.

12. An apparatus of detecting a watermark from content, comprising:
    a code supplying unit providing a band spreading code;
    a signal extractor configured to extract a level of a frequency component from the content;
    an information extractor configured to make bit values correspond based on a change in the extracted level to generate a bit sequence; and
    a watermark decoder configured to identify a correlation shifting a phase of a band spreading code provided from the code supplying unit for the generated bit sequence and to determine a bit group having a value corresponding to the phase shift amount of the band spreading code when the identified correlation is a auto-correlation.

13. The apparatus of claim 12, wherein the watermark decoder is configured to determine another bit group having a pre-assigned value for the band spreading code when the identified correlation is the auto-correlation.

14. The apparatus of claim 12, wherein the watermark decode is configured to specify the same bit section as a sync band spreading code over the bit sequence by identifying a correlation of the sync band spreading code having a constant phase with respect to the generated bit sequence, identifying the correlation shifting the phase of the band spreading code on a bit stream before or after the specified bit section.

15. The apparatus of claim 14, wherein the watermark decode is configured to verify a temporal interval between a plurality of sync bit sections specified as the same bit section as the sync band spreading code and to exclude at least part of the bit stream present between sync bi sections having a temporal interval departing from a predetermined temporal interval from identifying the correlation shifting the phase of the band spreading code.

16. The apparatus of claim 12, wherein the watermark decode is configured to select the phase shift amount from $k*2^p$ ($k=0, 1, 2, \ldots, p=1, 2, \ldots$), wherein p is a preset constant value.

17. The apparatus of claim 12, wherein the watermark decode is configured to, when the identified correlation corresponds to a auto-correlation, and unless the phase shift amount of the band spreading code is 0 or an integer multiple of $2^p$ ($p=1$, deem a value closest to 0 or the integer multiple as the phase shift amount, and to a corresponding value.

18. The apparatus of claim 12, wherein the information extractor comprises,
    a signal converter configured to convert the extracted level into a level variation ratio, and
    a bit extractor configured to perform a first step of splitting into time sections based on a point where the level variation ratio crosses upper and lower thresholds and determining a bit inserting period based on a temporal interval frequency between upper peaks of the level variation ratio, between lower peaks of the level variation ratio, or between the upper and lower peaks of the level variation ratio in each of the split time sections, and a second step of applying a bit value at every bit inserting period to generate the bit sequence.

19. The apparatus of claim 18, wherein the bit extractor is configured to apply the bit value at every bit inserting period to generate the bit sequence starting from an upper peak value or a lower peak value between upper peak values or between lower peak values, the upper or lower peak values having a temporal interval conforming to the determined bit inserting period.

20. The apparatus of claim 19, wherein the bit extractor is configured to generate the bit sequence, when an upper peak value larger than the upper threshold and a lower peak value smaller than the lower threshold are both present in the determined bit inserting period, by applying a first bit value to the inserting period, and otherwise, by applying a compliment number of the first bit value to the inserting period.

21. The apparatus of claim 18, wherein the watermark decoder is configured to, when no value corresponding to the auto-correlation is detected, adjust the upper and lower thresholds to request regeneration the bit sequence, and wherein the bit extractor is configured to, when the generated bit sequence does not satisfy a characteristic of a difference in number between 1's and 0's of the band spreading code, adjust the upper and lower thresholds to regenerate the bit sequence.

22. The apparatus of claim 18, wherein the signal extractor is configured to generate a signal reflecting a size of a coefficient for some regions of each frequency coefficient block of an image frame included in the content and to apply the signal to the information extractor.

23. The apparatus of claim 12, further comprising a controller configured to control an interface so that watermark data including the determined bit group is received from the watermark decoder and displayed on a screen.

* * * * *